US011822693B2

(12) United States Patent
Ki et al.

(10) Patent No.: US 11,822,693 B2
(45) Date of Patent: Nov. 21, 2023

(54) ELECTRONIC DEVICE MOUNTED ON VEHICLE AND OPERATING METHOD OF THE ELECTRONIC DEVICE

(71) Applicant: Samsung Electronics Co., Ltd., Gyeonggi-do (KR)

(72) Inventors: Hyunsik Ki, Gyeonggi-do (KR); Sangchul Ku, Gyeonggi-do (KR); Youngil Kim, Gyeonggi-do (KR); Junhong Kim, Gyeonggi-do (KR); Sanghoon Lee, Gyeonggi-do (KR); Woong Lee, Gyeonggi-do (KR); Junhyun Yim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 17/236,027

(22) Filed: Apr. 21, 2021

(65) Prior Publication Data
US 2022/0121774 A1    Apr. 21, 2022

(30) Foreign Application Priority Data
Oct. 19, 2020   (KR) ........................ 10-2020-0135521

(51) Int. Cl.
*G06F 21/62*   (2013.01)
*H04W 4/48*   (2018.01)
*G06V 20/59*   (2022.01)

(52) U.S. Cl.
CPC ........ *G06F 21/6245* (2013.01); *G06V 20/593* (2022.01); *H04W 4/48* (2018.02)

(58) Field of Classification Search
None
See application file for complete search history.

(56) References Cited

U.S. PATENT DOCUMENTS 9,171,268 B1 * 10/2015 Penilla ..................... B60L 1/06
9,333,859 B2    5/2016 Chun
(Continued)

FOREIGN PATENT DOCUMENTS

| JP | 2014133506 A | 7/2014 |
|---|---|---|
| JP | 5835124 B | 11/2015 |

(Continued)

OTHER PUBLICATIONS

European Search Report dated Oct. 13, 2021.
EP Notice of Allowance dated Sep. 21, 2023.

*Primary Examiner* — Alexander Lagor
*Assistant Examiner* — Felicia Farrow
(74) *Attorney, Agent, or Firm* — Cha & Reiter, LLC

(57) ABSTRACT

An electronic device is disclosed, including a sensor module configured to recognize boarding and alighting of a passenger from the vehicle, a network interface configured to communicate with a mobile device disposed in the vehicle, a memory, storing a program including one or more instructions, and a processor. The processor implements a method, including: detecting alighting of the passenger using the sensor module, or when a mobile device disconnects from the network interface, determining, by the processor, a deletion level for data related to personal information of a passenger, the deletion level based on a use history information of the passenger, including a latest use time and a use frequency, and deleting the data from the memory according to the determined deletion level.

20 Claims, 9 Drawing Sheets

(56) References Cited

U.S. PATENT DOCUMENTS

| | | | |
|---|---|---|---|
| 10,169,555 B2 * | 1/2019 | Tseng | G06F 21/31 |
| 10,652,337 B2 | 5/2020 | Brusco | |
| 2012/0005403 A1 * | 1/2012 | Scouller | G06F 11/0763 |
| | | | 711/E12.001 |
| 2016/0283698 A1 * | 9/2016 | Huang | G06F 21/32 |
| 2017/0259698 A1 * | 9/2017 | Cuddihy | B60N 2/914 |
| 2019/0166473 A1 * | 5/2019 | Venkatraman | G08G 1/202 |
| 2020/0162914 A1 | 5/2020 | Chun | |

FOREIGN PATENT DOCUMENTS

| | | | | |
|---|---|---|---|---|
| KR | 10-0787925 A | 12/2007 | | |
| KR | 10-1575266 B1 | 12/2015 | | |
| WO | 2018/218149 A1 | 11/2018 | | |
| WO | WO-2019015490 A1 * | 1/2019 | | G06F 3/06 |
| WO | 2019/070232 A1 | 4/2019 | | |

* cited by examiner

FIG. 5

| DELETION LEVEL | DELETION DATA |
|---|---|
| LEVEL 1 | DELETE TEMPORARY FILE (TERMINATE APPLICATION BEING EXECUTED) |
| LEVEL 2 | DELETE LEVEL 1 DELETION DATA AND CACHE DATA |
| LEVEL 3 | DELETE LEVEL 1 DELETION DATA, LEVEL 2 DELETION DATA, APPLICATION CONFIGURATION INFORMATION, NEWLY INSTALLED APPLICATION, AND USER-GENERATED DATA |
| LEVEL 4 | DELETE LEVEL 1 DELETION DATA, LEVEL 2 DELETION DATA, LEVEL 3 DELETION DATA, AND USER IDENTIFICATION INFORMATION |

ELECTRONIC DEVICE MOUNTED ON VEHICLE AND OPERATING METHOD OF THE ELECTRONIC DEVICE

CROSS-REFERENCE TO RELATED APPLICATION

This application is based on and claims priority under 35 U.S.C. § 119 to Korean Patent Application No. 10-2020-0135521, filed on Oct. 19, 2020, in the Korean Intellectual Property Office, the disclosure of which is incorporated by reference herein in its entirety.

TECHNICAL FIELD

The disclosure relates to passenger detection in a vehicle, and, more particularly, to detecting alighting of a passenger and processor information related to personal data of the same passenger upon alighting.

BACKGROUND

Recent vehicles are increasingly equipped with infotainment systems that provide various information to passengers and output multimedia content, instead of being limited to a simple transportation functions. The 'infotainment system' may refer to a system which integrates information relevant to operation of the vehicle, navigational guidance, etc., and entertainment media such as playback of multimedia content, artificial intelligence assistant services, etc. With the popularization of smartphones and tablet personal computers (PCs) and the development of information technology (IT) beyond convergence of navigation, audio and video, and the Internet in the vehicle, the technical sophistication and consumer market for the infotainment systems are growing year after year.

In particular, recently, infotainment systems are increasingly installed seat-by-seat in public transportation vehicles such as buses, airplanes, etc., to provide premium services.

SUMMARY

Passengers are often anonymous in the context of public transportation such as buses, airplanes, etc., or a vehicle sharing service. Furthermore, insofar as the vehicular infotainment systems are not always equipped to recognize boarding and exit of the passengers, and so, the passenger's infotainment usage information, such as searches executed during the use of the infotainment system, and personal information such as login information, may remain on the infotainment system without removal even after the passenger has exited the vehicle. Thus, privacy concerns arise in the context of using these public infotainment systems. Moreover, even when the passenger alights from the vehicle, power continues to be supplied to the infotainment system, increasing wasteful power consumption of the vehicle.

An electronic device and an operating method of the same are provided in the present disclosure, in which alighting of a passenger from a vehicle is detected, and data related to personal information is automatically deleted based on usage history information. Accordingly, the personal information of the passenger using the electronic device mounted on the vehicle may be protected, and furthermore, unnecessary power consumption may be reduced.

Additional aspects will be set forth in part in the description which follows and, in part, will be apparent from the description, or may be learned by practice of the presented embodiments of the disclosure.

According to an embodiment of the disclosure, an electronic device mounted on a vehicle is provided. An electronic device mounted on a vehicle according to an embodiment of the disclosure includes a data storage unit, a sensor module configured to recognize a passenger boarding the vehicle, a network interface configured to perform device-to-device (D2D) connection with a mobile device used by the passenger and transmit and receive data to and from the mobile device, a memory storing a program including one or more instructions for controlling the electronic device, and a processor configured to execute the one or more instructions of the program stored in the memory, in which the processor is further configured to execute the one or more instructions to recognize alighting of the passenger from the vehicle by using at least one of a passenger recognition result obtained using the sensor module or information about connection with the mobile device, obtained using the network interface, to determine a deletion level of data related to personal information of the passenger based on use history information of the passenger, which includes latest use time and use frequency, and to delete the data related to the personal information, stored in the data storage unit, based on the determined deletion level. It is understood that the phrase "module" may indicate hardware implementing the requisite functionality using circuitry and other computer processing components. Accordingly, phrases such as "sensor module" and the like, as used in this disclosure, should be understood to include "sensor circuitry."

In an embodiment of the disclosure, the processor may be further configured to execute the one or more instructions to recognize alighting of the passenger from the vehicle by controlling the network interface to periodically transmit and receive a packet for identifying the connection with the mobile device.

In an embodiment of the disclosure, the processor may be further configured to execute the one or more instructions to recognize alighting of the passenger from the vehicle based on an identification result with respect to maintenance of the connection with the mobile device and the passenger recognition result obtained using an infrared sensor of the sensor module.

In an embodiment of the disclosure, the electronic device may further include a camera configured to obtain a passenger image by photographing the passenger boarding the vehicle, in which the processor may be further configured to execute the one or more instructions to detect the passenger from the passenger image by using image processing or an object recognition model and to recognize alighting of the passenger based on a result of the detecting with respect to the passenger and the identification result with respect to maintenance of the connection with the mobile device.

In an embodiment of the disclosure, the processor may be configured to execute the one or more instructions to recognize seating on a seat of the vehicle based on a pressure measured using a seat sensor included in the seat of the vehicle and to recognize alighting of the passenger from the vehicle based on a result of the recognizing of the seating.

In an embodiment of the disclosure, the processor may be configured to execute the one or more instructions to determine at least one piece of deletion-target data from among a temporary file generated as a result of using the electronic device by the passenger, cache data, application configuration information, a newly installed application, user-generated data, or user's access information.

In an embodiment of the disclosure, the processor may be configured to execute the one or more instructions to determine the deletion level based on the use history information and whether identification information of the passenger is equal to identification information of a previous user.

In an embodiment of the disclosure, the processor may be configured to execute the one or more instructions to determine the deletion level based on the use history information, owner information of the vehicle having mounted thereon the electronic device, and information about the vehicle operation type.

In an embodiment of the disclosure, the processor may be configured to execute the one or more instructions to obtain user identification information of a second passenger through login after logout of a first passenger and to determine whether to delete data related to personal information of the first passenger who is a previous user, based on the user identification information of the second passenger and delete the data related to the personal information of the first passenger based on a result of the determining.

In an embodiment of the disclosure, the processor may be configured to execute the one or more instructions to identify non-deleted data that is not deleted among the data related to the personal information due to cutoff or stop of power supplied to the electronic device from the vehicle and to delete the determined non-deleted data.

According to an embodiment of the disclosure, an operating method of an electronic device mounted on a vehicle is provided. The operating method includes recognizing alighting of a passenger from the vehicle by using at least one of a recognition result obtained using a sensor module or information about connection with a mobile device, determining a deletion level of data related to personal information of the passenger, based on use history information of the passenger, the use history information including latest use time and use frequency, deleting the data related to the personal information based on the determined deletion level, and logging out in response to a deletion completion signal of the data related to the personal information.

In an embodiment of the disclosure, the recognizing of the alighting of the passenger from the vehicle may include recognizing alighting of the passenger by periodically transmitting and receiving a packet for identifying the connection with the mobile device connected through a network interface.

In an embodiment of the disclosure, the recognizing of the alighting of the passenger may include obtaining a passenger image by photographing the passenger using a camera, detecting the passenger from the passenger image by using image processing or an object recognition model, and recognizing alighting of the passenger based on a result of the detecting with respect to the passenger and an identification result with respect to maintenance of the connection with the mobile device.

In an embodiment of the disclosure, the recognizing of the alighting of the passenger from the vehicle may include recognizing seating on a seat of the vehicle based on a pressure measured using a seat sensor included in the seat of the vehicle and recognizing alighting of the passenger based on a result of the recognizing of the seating.

In an embodiment of the disclosure, the determining of the deletion level of the data related to the personal information may include determining at least one piece of deletion-target data from among a temporary file generated as a result of using the electronic device by the passenger, cache data, application configuration information, a newly installed application, user-generated data, or user's access information.

In an embodiment of the disclosure, the determining of the deletion level of the data related to the personal information may include determining the deletion level based on the use history information and whether identification information of the passenger is equal to identification information of a previous user.

In an embodiment of the disclosure, the determining of the deletion level of the data related to the personal information may include determining the deletion level based on the use history information, owner information of the vehicle having mounted thereon the electronic device, and information about the vehicle operation type.

In an embodiment of the disclosure, the operating method may further include obtaining user identification information of a second passenger through login after logout of a first passenger, determining whether to delete data related to personal information of the first passenger who is a previous user, based on the user identification information of the second passenger, and deleting the data related to the personal information of the first passenger based on a result of the determining.

In an embodiment of the disclosure, the operating method may further include identifying non-deleted data that is not deleted among the data related to the personal information due to cutoff or stop of power supplied to the electronic device from the vehicle and deleting the determined non-deleted data.

In certain embodiments of the invention, an electronic device is disclosed. The electronic device is mounted on a vehicle, and includes: a sensor module configured to recognize boarding and alighting of a passenger from the vehicle, a network interface configured to communicate with a mobile device disposed in the vehicle, a memory, storing a program including one or more instructions, and a processor, configured to execute the one or more instructions of the program, causing the electronic device to: detect alighting of the passenger using the sensor module, or detect alighting of the passenger when the mobile device disconnects from the network interface, determine a deletion level for data related to personal information of the passenger, the deletion level based on a use history information of the passenger, including a latest use time and a use frequency, and delete the data from the memory according to the determined deletion level.

In certain embodiments of the invention, an operation method of an electronic device mounted on a vehicle is disclosed, including: detecting alighting of a passenger using a sensor module, or when a mobile device disconnects from a network interface, determining, by a processor, a deletion level for data related to personal information of a passenger, the deletion level based on a use history information of the passenger, including a latest use time and a use frequency, and deleting the data from a memory according to the determined deletion level, and in response to receive a signal indicating completion of the deletion, logging the passenger out.

In certain embodiments of the invention, a computer program product is disclosed including a non-transitory computer-readable storage medium, wherein the computer-readable storage medium comprises instructions executed by an electronic device mounted on a vehicle, the instructions comprising: detecting alighting of a passenger using a sensor module, or when a mobile device disconnects from a network interface, determining, by a processor, a deletion level for data related to personal information of a passenger, the deletion level based on a use history information of the passenger, including a latest use time and a use frequency, deleting the data from a memory according to the determined deletion level, and in response to receive a signal indicating completion of the deletion, logging the passenger out.

According to another embodiment of the disclosure, a computer-readable recording medium has recorded thereon a program to be executed on a computer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 shows a table showing deletion-target data of personal information-related data with respect to a deletion level determined by an electronic device, according to an embodiment of the disclosure;

DETAILED DESCRIPTION

Figure 1:
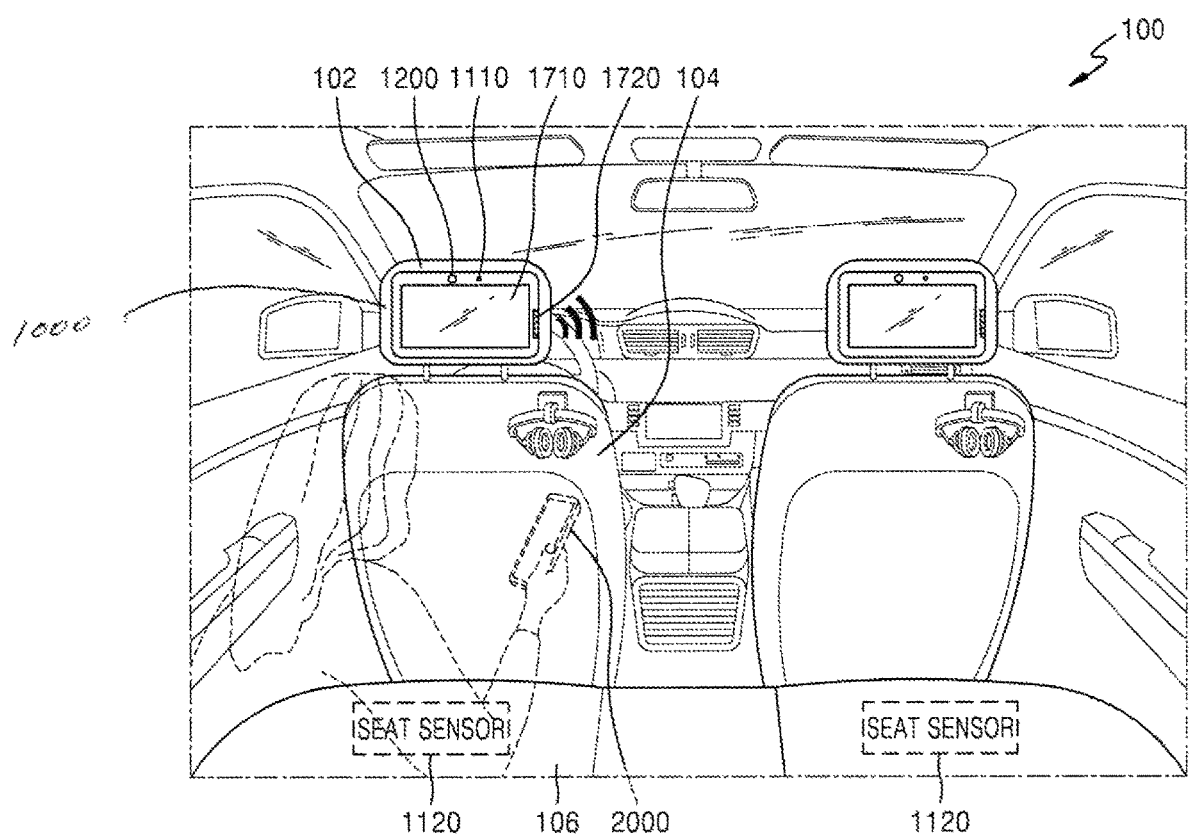
FIG. 1 is a diagram for describing a structure and arrangement of an electronic device according to an embodiment of the disclosure.

Although terms used in embodiments of the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

It is to be understood that a singular form of a noun corresponding to an item may include one or more of the things, unless the relevant context clearly indicates otherwise. All of the terms used herein including technical or scientific terms have the same meanings as those generally understood by those of ordinary skill in a technical field described in the specification.

Throughout the disclosure, when a certain part "includes" or "comprises" a certain component, unless there is a particular description contrary thereto, the part may further include or comprise other components, not excluding the other components. The term used in the specification such as "unit" or "module" indicates a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof.

An expression "configured (or set) to" used in the specification may be replaced with, for example, "suitable for," "having the capacity to," "designed to," "adapted to," "made to," or "capable of" according to a situation. The term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that may perform a corresponding operation by executing at least one software program stored in a memory.

Herein, a 'vehicle' may refer to a transportation mode which at least one passenger boards.

Herein, a 'type of a vehicle' may be classified according to different types, such as a privately-owned vehicle, and a shared-usage vehicle, according to an owner of the vehicle. Herein, the 'type of the vehicle' may also be classified into a general vehicle, public transportation, and a commercial vehicle, according to an operating type.

Herein, a 'passenger' may refer to a driver, a passenger in the front passenger seat, and a passenger in a rear seat. When the passenger uses an electronic device mounted on the vehicle, the passenger may be considered a "user" of the electronic device.

FIG. 1 is a diagram for describing a structure and arrangement of an electronic device 1000, according to an embodiment of the disclosure.

Referring to FIG. 1, the electronic device 1000 may be arranged in an internal structure of a vehicle 100. As seen in FIG. 1, various components of the electronic device 1000 are mounted in disparate positions within the interior of the vehicle 100. In an embodiment of the disclosure, some components of the electronic device 1000 may be arranged in a seat structure inside the vehicle 100. For example, some components of the electronic device 1000 may be arranged attached to a head rest 102 or a seat back 104 of a front seat with respect to a passenger.

In an embodiment of the disclosure shown in FIG. 1, at least one passenger may board the vehicle 100. As noted above, a type of the vehicle 100 may be, for example, a privately-owned vehicle, public transportation, a commercial vehicle, or a shared vehicle.

The electronic device 1000 may include an infrared sensor 1110, a seat sensor 1120, a camera 1200, a display unit 1710, and a speaker 1720. However, components included in the electronic device 1000 are not limited to those illustrated in FIG. 1. The components of the electronic device 1000 will be described in detail with reference to FIG. 2.

Figure 2:
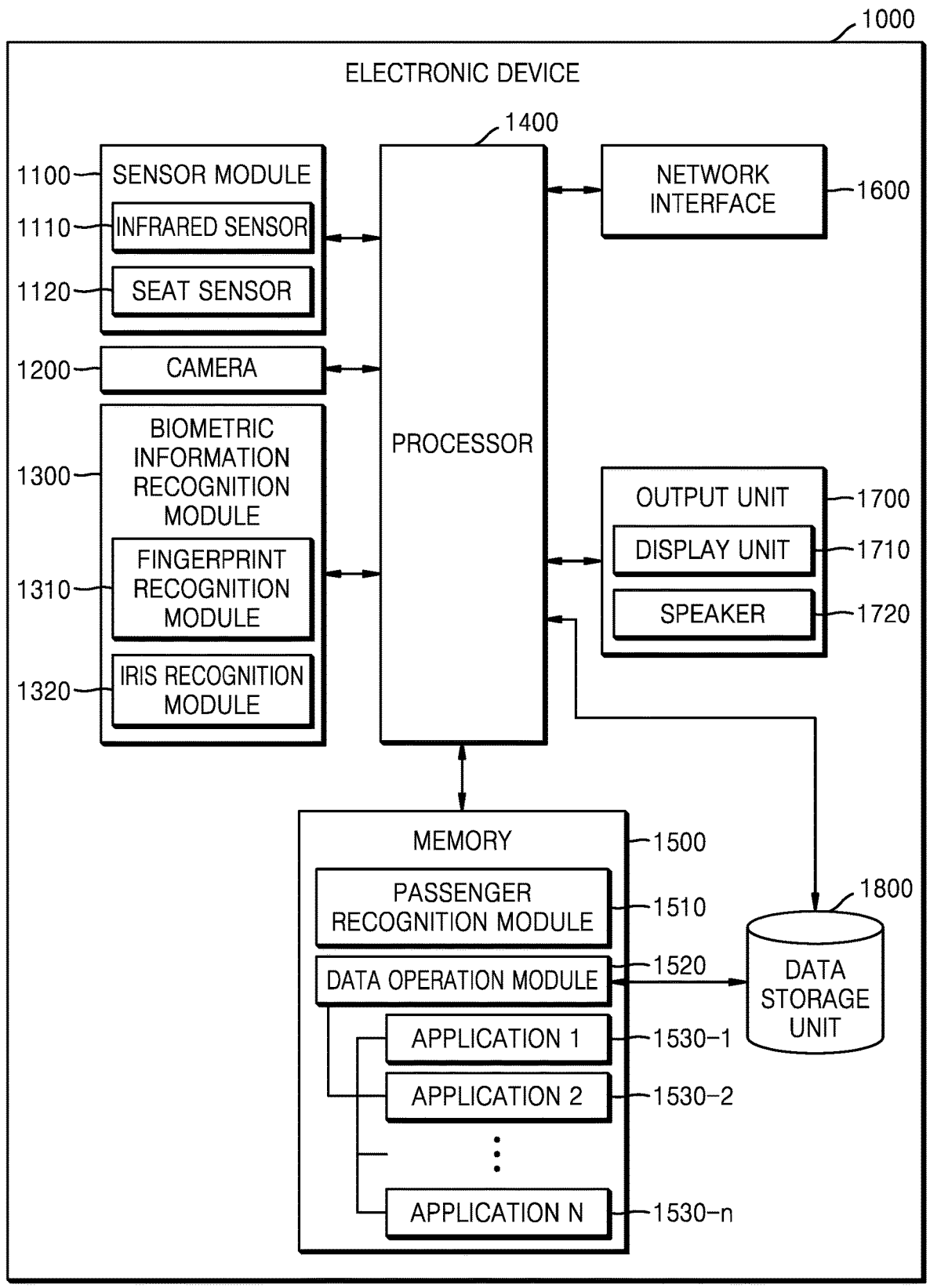
FIG. 2 is a block diagram showing components of an electronic device according to an embodiment of the disclosure.

The electronic device 1000 may perform at least one operation or function by executing at least one application 1530-1 through 1530-n (see FIG. 2) stored in an internal memory 1500 (see FIG. 2). The electronic device 1000 may perform an operation or a function of playing multimedia content such as movies, music, etc., providing weather information, traffic information, news, etc., providing an Internet shopping service, or providing a social networking service (SNS). The electronic device 1000 may output an image, provided by executing multimedia content playback, navigation information display, Internet shopping, etc., through the display unit 1710, and output an audio signal through the speaker 1720.

The electronic device 1000 may perform device-to-device (D2D) connection with a mobile device 2000. In an embodiment of the disclosure, the electronic device 1000 may perform communicative connection with the mobile device 2000 and transmit data to and receive data from the mobile device 2000, through at least one of communication schemes including Wireless Fidelity (WiFi) Direct, Bluetooth, Long Term Evolution (LTE)-D2D, and $5^{th}$-Generation (5G) D2D. In certain embodiments, the electronic device 1000 may perform wired connection with the electronic device, such as by universal serial bus cable.

The electronic device 1000 may recognize exiting (e.g., alighting) of a passenger from the vehicle, and automatically delete data related to personal information (or personal information-related data) related to the passenger, stored in a data storage unit 1800 (see FIG. 2), based on an alighting recognition result. The electronic device 1000 may recognize whether the passenger alights the vehicle 100, by using at least one of a recognition result obtained using the sensor module 1100 (see FIG. 2) or connection information with the mobile device 2000. In an embodiment of the disclosure, the electronic device 1000 may determine whether connection with the mobile device 2000 is maintained, by periodically transmitting and receiving a packet for identifying connection with the mobile device 2000, and recognize alighting of the passenger based on an identification result (e.g., when responses cease to be received from the mobile device 2000). In another embodiment of the disclosure, the electronic device 1000 may recognize alighting of the passenger using the infrared sensor 1110 (e.g., when a reflection of infrared light indicating the presence of the passenger changes, and now indicates absence) and an identification result regarding maintenance of connection with the mobile device 2000. In another embodiment of the disclosure, the electronic device 1000 may detect a presence of the passenger from an image of the interior of the vehicle obtained using the camera 1200. The passenger may be identified using various object recognition techniques, and alighting of the passenger may be detected when the passenger is no longer detected within the captured images. This detection may likewise be combined with the identification result regarding maintenance of connection with the mobile device 2000.

In an embodiment of the disclosure, the electronic device 1000 may recognize alighting of the passenger based on a measurement value obtained by the seat sensor 1120. The seat sensor 1120 may be a pressure sensor arranged in a seat cushion 106 of the vehicle 100, and may recognize seating of the passenger by recognizing a pressure applied to the seat cushion 106 (e.g., a pressure level reaching a predetermined threshold). The electronic device 1000 may recognize alighting of the passenger based on a pressure measured by the seat sensor 1120.

When the electronic device 1000 recognizes alighting of the passenger, the electronic device 1000 may determine a deletion level of the data related to the personal information of the passenger, based on use history information of the passenger, which includes the latest use time and use frequency. The 'personal information' may include at least one of the passenger's identification information (e.g., a user ID and a password) with which the passenger logs into the electronic device 1000, a log history or type of a activated application, a website that was visited, a search history for one or more applications, or information about a newly installed application. The 'deletion level of the personal information-related data' may indicate a level for determining a subset or totality of information to be deleted from the personal information-related data generated, and/or edited by the passenger using the electronic device 1000. In an embodiment of the disclosure, the electronic device 1000 may determine at least one piece of deletion-target data from among a temporary file generated as a result of the passenger using the electronic device 1000, cache data, application configuration information, a newly installed application, user-generated data, or user's access information. A detailed method, performed by the electronic device 1000, of determining a deletion level of personal information data will be described in detail with reference to FIG. 5.

In an embodiment of the disclosure, when the passenger logs in, the electronic device 1000 may compare identification information of a previous user (e.g., information from a former passenger using the electronic device 1000 before the present passenger), with identification information of the present passenger, and delete personal information-related data of the previous user based on whether the identification of the previous user and the identification information of the passenger match. That is, when a match is not detected, the passengers are identified as distinct, and thus, deletion is executed to maintain privacy. However, when a match is detected, that means the previous passenger and the present passenger are the same person. In this case, the information need not be deleted, improving the convenience and usability of the electronic device 1000 for the passenger.

In an embodiment of the disclosure, the electronic device 1000 may determine the deletion level of the personal information-related data based on owner information and vehicle operation type (e.g., public transportation or sharing-service-provided vehicle) of the vehicle 100 as well as use history information of the passenger.

When alighting of the passenger is recognized, the electronic device 1000 may automatically delete the personal information-related data of the passenger based on the deletion level of the personal information data and log out of the electronic device 1000. In an embodiment of the disclosure, when the electronic device 1000 recognizes alighting of the passenger, the electronic device 1000 may automatically cut off power supply after recognizing the logout.

Recently, in public transportation such as a bus, an airplane, etc., as well as a general private vehicle, the electronic device 1000 including an infotainment system has been mounted on the head rest 102 or the seat back 104 of a seat to provide a premium service. In the case of public transportation such as buses, airplanes, etc., or a vehicle sharing service, passengers are unspecified individuals, and the vehicle may not recognize alighting of the passengers from the vehicle, such that search records during the use of the electronic device 1000 of the passengers and personal information like login information, a picture, a message, etc., may remain without being removed, incurring a problem of privacy protection. Moreover, even if the passenger alights from the vehicle, power is continuously supplied to an electronic device of the infotainment system because the vehicle may not recognize alighting of the passenger, causing power consumption of the vehicle.

The electronic device 1000 according to the disclosure may recognize alighting of the passenger from the vehicle and automatically delete the personal information-related data based on the use history information including the latest use time and use frequency of the passenger, thereby preventing the leakage of the personal information. In particular, the electronic device 1000 according to the disclosure may determine the deletion level of the personal information-related data based on the owner information and vehicle operation type of the vehicle 100 as well as the use history information of the passenger, thereby reinforcing protection of the personal information of the passenger and protecting privacy for public transportation or a sharing-service-provided vehicle.

The electronic device 1000 according to an embodiment of the disclosure may determine the deletion level of the personal information-related data based on the identification information of the passenger as well as the use history information of the passenger, such that when the passenger does not need to delete the entire personal information like when the same passenger uses the electronic device 1000 again, the passenger may use existing personal information-related data again, thereby improving user convenience.

FIG. 2 is a block diagram showing components of the electronic device 1000 according to an embodiment of the disclosure. The electronic device 1000 may be mounted on an internal structure of the vehicle 100 (see FIG. 1). In an embodiment of the disclosure, the electronic device 1000 may be arranged attached to the head rest 102 (see FIG. 1) or the seat back 104 (see FIG. 1) of the front seat with respect to the passenger. However, an arrangement position of the electronic device 1000 is not limited to the above-described example.

Referring to FIG. 2, the electronic device 1000 may include a sensor module 1100, a camera 1200, a biometric information recognition module 1300, a processor 1400, a memory 1500, a network interface 1600, an output unit 1700, and a data storage unit 1800. The sensor module 1100, the camera 1200, the biometric information recognition module 1300, the processor 1400, the memory 1500, the network interface 1600, the output unit 1700, and the data storage unit 1800 may be electrically and/or physically connected with one another. Components shown in FIG. 2 merely correspond to an embodiment of the disclosure, and components included in the electronic device 1000 are not limited to those shown in FIG. 2. The electronic device 1000 may not include some of the components shown in FIG. 2, or may further include other components than the ones shown in FIG. 2.

The sensor module 1100 may be configured to recognize the passenger by detecting the number of people who board or exit the vehicle 100 (see FIG. 1). In an embodiment of the disclosure, the sensor module 1100 may recognize alighting of the passenger from the vehicle and provide an alighting recognition result to the processor 1400. The sensor module 1100 may include the infrared sensor 1110 and the seat sensor 1120.

The infrared sensor 1110 may detect a present of the passenger by using infrared light and recognize alighting of the passenger from the vehicle based on a sensing result. The infrared sensor 1110 may include a plurality of image sensors and/or a light output unit that outputs infrared rays. The infrared sensor 1110 may sense the passenger using, e.g., a time of flight (ToF) scheme, a structured light scheme, or a disparity scheme. The infrared sensor 1110 may be arranged on a front portion of the electronic device 1000 and may recognize alighting of the passenger by tracking the passenger facing the electronic device 1000. The infrared sensor 1110 may provide information about an alighting recognition result with respect to the passenger to the processor 1400.

The seat sensor 1120 may be arranged in the seat cushion 106 (see FIG. 1) of the vehicle 100. When there are a plurality of seat cushions 106, a plurality of seat sensors 1120 may be arranged on the plurality of seat cushions 106, respectively. The seat sensor 1120 may recognize seating of the passenger by measuring a pressure to the seat cushion 106. The seat sensor 1120 may include, for example, a pressure sensor. In an embodiment of the disclosure, the seat sensor 1120 may recognize that the passenger is seated when the pressure applied to the seat cushion 106 exceeds a preset threshold pressure. The seat sensor 1120 may recognize that the passenger is not seated, i.e., an alighting state, when the pressure applied to the seat cushion 106 is less than or equal to the preset threshold pressure. The seat sensor 1120 may provide the information about the alighting recognition result with respect to the passenger to the processor 1400.

The camera 1200 may photograph the passenger on board in the vehicle 100 (see FIG. 1), and obtain the passenger image in real time. In an embodiment of the disclosure, the camera 1200 may capture imagery of an interior of the vehicle, which may include photographing the passenger disposed in the vehicle. The field of view may be set as to capture a view of the driver's seat, the front passenger seat, and/or a rear passenger seat, and provide the captured imagery to the processor 1400. There may be one camera 1200 or a plurality of cameras 1200.

The camera 1200 may include an image sensor such as a complementary metal-oxide semiconductor (CMOS) image sensor, a charge-coupled device (CCD) image sensor, or an active pixel sensor, and at least one of a linear lens, a concave lens, a convex lens, a wide-angle lens, or fish-eye lens. The camera 1200 may be of an analog type or a digital type. In an embodiment of the disclosure, the camera 1200 may include an infrared light output device. In an embodiment of the disclosure, the camera 1200 may be arranged in a bezel part of a front portion of the electronic device 1000. However, the disclosure is not limited thereto, and the camera 1200 may also be arranged in a particular region of the vehicle 100, e.g., the head rest 102 (see FIG. 1) or the seat back 104 (see FIG. 1) of the seat, a dashboard, a rear-view mirror, or an upper portion of the dashboard. However, an arrangement position of the camera 1200 is not limited to the above-described example.

The biometric information recognition module 1300 may include a module configured to recognize biometric information of a vehicle passenger. The biometric information recognition module 1300 may include a fingerprint recognition module 1310 and/or an iris recognition module 1320.

The fingerprint recognition module 1310 may include a sensor for recognizing a fingerprint of the passenger. The passenger may bring the finger into contact with the fingerprint recognition module 1310 of the electronic device 1000 to cause the fingerprint recognition module 1310 to recognize the fingerprint. The fingerprint recognition module 1310 may provide fingerprint information obtained from the passenger to the processor 1400.

The iris recognition module 1320 may include a sensor for obtaining iris information of the passenger. The iris information of the passenger may include identification information regarding a user currently using the electronic device 1000, a current position of the iris of the current passenger, etc. The iris recognition module 1320 may provide the iris information obtained from the passenger to the processor 1400.

It should be understood that the fingerprint recognition sensor and the iris recognition sensor may include any sensor known in the present technical field, without being limited to any particular implementations of the sensors. A detailed description of other possible implementations of the fingerprint recognition sensor and the iris recognition sensor will be omitted.

The processor 1400 may execute one or more instructions stored in the memory 1500. The processor 1400 may include hardware components that perform arithmetic, logic, and input/output operations and signal processing. The processor 1400 may include at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), or field programmable gate arrays (FPGAs), without being limited thereto. In an embodiment of the disclosure, the processor 1400 may include an application processor (AP).

In an embodiment of the disclosure, the processor 1400 may include a dedicated hardware chip that performs artificial intelligence (AI) learning.

The memory 1500 may include non-volatile memory including at least one of memory of a flash memory type, a hard disk type, a multimedia card micro type, or a card type (e.g., secure digital (SD) memory, extreme digital (XD) memory, etc.), read-only memory (ROM), electrically erasable programmable read-only memory (EEPROM), or programmable read-only memory (PROM) and volatile memory such as random-access memory (RAM) or static random-access memory (SRAM).

The memory 1500 may store instructions readable by the processor 1400, a data structure, and program code. In the following embodiment of the disclosure, the processor 1400 may be implemented by executing instructions or code of a program stored in the memory 1500.

The memory 1500 may include a passenger recognition module 1510, a data management module 1520, and instructions or program code regarding the applications 1530-1 through 1530-*n*. A '~module' stored in the memory 1500 may mean a unit for processing at least one function or operation, which may include software including instructions or program code driven and executed by the processor 1400.

A passenger recognition module 1510 may be configured to detect a present of the passenger within the vehicle by using at least one of a recognition result of the sensor module 1100, and/or information indicating a connection with the mobile device through the network interface 1600. The processor 1400 may recognize alighting of the passenger from the vehicle by executing instructions or program code related to the passenger recognition module 1510.

In an embodiment of the disclosure, the processor 1400 may recognize alighting of the passenger from the vehicle based on a passenger recognition result obtained from the infrared sensor 1110 of the sensor module 1100.

In an embodiment of the disclosure, the processor 1400 may recognize alighting of the passenger based on information about a pressure measured by the seat sensor 1120. For example, when the pressure measured by the seat sensor 1120 is less than or equal to the preset threshold value, the processor 1400 may determine that the passenger alights the vehicle.

In an embodiment of the disclosure, the processor 1400 may detect a presence of the passenger based on a captured image of an interior of the vehicle, obtained by photographing using the camera 1200, and recognize alighting of the passenger from the vehicle based on a detection result (e.g., passenger is no longer detected in the captured imagery). In an embodiment of the disclosure, the passenger recognition module 1510 may include an object recognition model. The object recognition model may be a model that recognizes a target object from the image obtained using the camera 1200. Herein, the 'target object' may indicate an object of interest to be recognized from an image. The target object may include at least one of, for example, body portions such as face, hair, clothes, or body-related information, such as stance, posture, physique, etc. of a person. In an embodiment of the disclosure, the object recognition model may be configured to detect the passenger in the passenger image using an artificial intelligence (AI) model using a known image processing algorithm and/or deep learning. In an embodiment of the disclosure, the object recognition model may recognize the passenger from the passenger image through training using a convolution neural network (CNN) including a pre-trained model parameter. The object recognition model may recognize a face of the passenger.

The object recognition model may be configured to recognize the passenger from the passenger image by using the pre-trained model parameter through the CNN. For example, the object recognition model may detect a face of a person from the passenger image through a large-scale data set, e.g., CASIA-WebFace, VGGFace/VGGFace 2, or MS-Celeb-1M. In an embodiment of the disclosure, the object recognition model may include pre-trained MobileNet to perform face recognition using the data set VGGFace2.

However, the object recognition model is not limited to recognizing the passenger by using the above-described method or algorithm. In an embodiment of the disclosure, the object recognition model may be configured to recognize the passenger from the passenger image by using an AI model including at least one of a recurrent neural network (RNN), a support vector machine (SVM), linear regression, logistic regression, Naive Bayes, random forest, a decision tree, or a k-nearest neighbor algorithm.

The processor 1400 may obtain information about a recognition result with respect to the passenger from the object recognition model and determine alighting of the passenger from the vehicle based on the obtained recognition result with respect to the passenger. For example, when the processor 1400 obtains information indicating that the passenger is not recognized, from the object recognition model, the processor 1400 may determine that the passenger alights from the vehicle.

The processor 1400 may recognize alighting of the passenger from the vehicle, based on information about maintenance of connection with the mobile device through the network interface 1600. The network interface 1600 may be connected with the mobile device 2000 (see FIG. 1) in a device-to-device (D2D) scheme, and may transmit data to and receive data from the mobile device 2000. For example, the network interface 1600 may perform connection with the mobile device 2000 and transmit data to and receive data from the mobile device, through at least one of communication schemes including WiFi Direct, Bluetooth, LTE-D2D, and 5G D2D. The processor 1400 may control the network interface 1600 to periodically transmit a connection-identifying packet to the mobile device 2000 at certain intervals and to receive a connection acknowledgement from the mobile device 2000, thereby identifying whether connection between the mobile device 2000 and the electronic device 1000 is maintained.

When the processor 1400 receives the connection acknowledgement from the mobile device 2000, the processor 1400 may determine that the user of the mobile device 2000 is aboard the vehicle 100(see FIG. 1). When the processor 1400 fails to receive the connection acknowledgement from the mobile device 2000 or a predetermined time period elapses after transmission of the connection-identifying packet, the processor 1400 may determine that the user of the mobile device 2000 alights from the vehicle 100. A detailed description will be made with reference to FIG. 4 regarding a detailed embodiment of the disclosure where the processor 1400 determines alighting of the user of the mobile device 2000 based on the identification result regarding maintenance of connection with the mobile device 2000.

The processor 1400 may recognize alighting of the passenger from the vehicle by combining two or more of the above-described embodiments of the disclosure. In an embodiment of the disclosure, the processor 1400 may recognize alighting of the passenger from the vehicle based on at least one of the recognition result obtained using the infrared sensor 1110 and the seat sensor 1120, the detection result with respect to the passenger from the passenger image obtained using the camera 1200, and/or the identification result regarding maintenance of connection with the mobile device 2000 through the network interface 1600. For example, when the passenger is not detected from the infrared sensor 1110 or the pressure obtained from the seat sensor 1120 is less than or equal to a previously obtained threshold value, the processor 1400 may change the electronic device 1000 into a lock state, determine disconnection with the mobile device 2000 through the network interface 1600, and then determine alighting of the passenger from the vehicle.

The data management module 1520 may include a module that manages data generated by the passenger executing the applications 1530-1 through 1530-*n* or data edited by the passenger. The data management module 1520 may be configured to automatically delete the personal information-related data of the passenger among data stored in the data storage unit 1800, based on the use history information regarding the use of the electronic device 1000 by the passenger. Herein, the 'personal information' may include at least one of identification information (e.g., a user ID and a password) with which the passenger logs into the electronic device 1000, a type of a used application, a visited website, search information in an application, or information about a newly installed application. A data management module 1520 may determine a deletion level for selectively deleting deletion-target data among the personal information-related data, instead of collectively deleting the personal information-related data. In an embodiment of the disclosure, the data management module 1520 may determine at least one piece of deletion-target data from among a temporary file generated as a result of the passenger using the electronic device 1000, cache data, application configuration information, a newly installed application, user-generated data, or user's access information.

When the processor 1400 recognizes alighting of the passenger from the vehicle, the processor 1400 may execute instructions or program code related to the data management module 1520 to determine the deletion level of the personal information-related data of the passenger based on the use history information regarding the latest use time and use frequency of the passenger. In an embodiment of the disclosure, the processor 1400 may determine the deletion level of the personal information-related data based on identification information of the passenger, obtained by login or by the biometric information recognition module 1300 as well as the use history information of the passenger. For example, when the passenger logs in, the electronic device 1000 may compare identification information of a previous user, i.e., a user using the electronic device 1000 before the passenger, with identification information of the passenger, and delete personal information-related data of the previous user based on whether the identification of the previous user and the identification information of the passenger are the same as each other.

In an embodiment of the disclosure, the processor 1400 may determine the deletion level of the personal information-related data based on owner information and vehicle management type (e.g., public transportation or a sharing-service-provided vehicle) of the vehicle 100 as well as use history information of the passenger.

A detailed method, performed by the processor 1400, of determining a deletion level of personal information data will be described in detail with reference to FIG. 5.

The applications 1530-1 through 1530-*n* may include software programs that are driven and executed by the electronic device 1000 to perform a particular function or operation. While the applications 1530-1 through 1530-*n* are illustrated as plural in FIG. 2, the disclosure is not limited thereto. The applications 1530-1 through 1530-*n* may be one or plural. Data generated as a result of execution of the applications 1530-1 through 1530-*n* or edited data may be stored in the data storage unit 1800 by the data management module 1520.

An output unit 1700 may be configured to output image data or audio signal, by executing the applications 1530-1 through 1530-*n*. The output unit 1700 may include the display unit 1710 and the speaker 1720.

The display unit 1710 may output an image corresponding to video data through an internally included display panel via which the user may visually recognize the image or the video data. The display unit 1710 may include, for example, at least one of a liquid crystal display (LCD), a thin film transistor (TFT) LCD, an organic light-emitting diode (OLED) display, a flexible display, a three-dimensional (3D) display, or an electrophoretic display.

In an embodiment of the disclosure, the display unit 1710 may further include a touch pad coupled with a display panel. When the display unit 1710 is formed as the display panel coupled with the touch pad, the display unit 1710 may output a user interface (UI) for receiving a touch input. When a user's touch input corresponding to a certain command is detected through the UI, the display unit 1710 may transmit the sensed touch input to the processor 1400. The processor 1400 may recognize and execute the certain command input by the user by interpreting the sensed touch input.

The speaker 1720 may output audio data provided from the applications 1530-1 through 1530-*n*.

The data storage unit 1800 may include a database that stores identification information of the passenger and data generated through the applications 1530-1 through 1530-*n* or edited data. In an embodiment of the disclosure, the data storage unit 1800 may include non-volatile memory. The 'non-volatile memory' may indicate a storage medium capable of storing and maintaining information even when power is not supplied, and using stored information when the power is supplied. The data storage unit 1800 may include at least one of, for example, flash memory, a hard disk, a state drive (SSD), ROM, magnetic memory, a magnetic disk, or an optical disk.

While the data storage unit 1800 is illustrated as a separate component that is not the memory 1500 of the electronic device 1000 in FIG. 2, the disclosure is not limited thereto. In an embodiment of the disclosure, the data storage unit 1800 may be included in the memory 1500.

In an embodiment of the disclosure, the data storage unit 1800 may be connected as an external component not included in the electronic device 1000 through the network interface 1600 (e.g., a communication interface) based on wireless/wired communication. In this case, the data storage unit 1800 may include an external memory card (e.g., a micro secure digital (SD) card, an SD card, an extreme digital (XD) memory, etc.).

Figure 3:
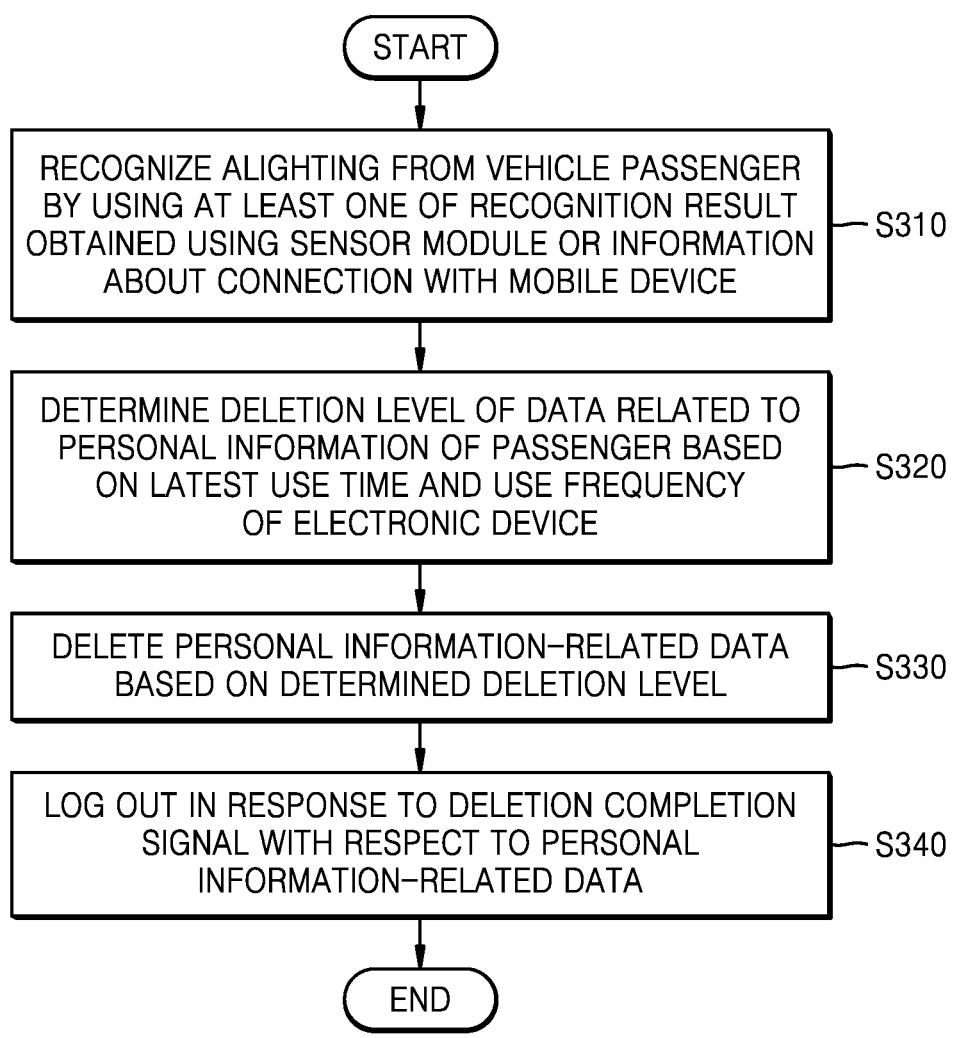
FIG. 3 is a flowchart showing an operating method of an electronic device according to an embodiment of the disclosure.

FIG. 3 is a flowchart showing an operating method of the electronic device 1000 according to an embodiment of the disclosure.

In operation S310, the electronic device 1000 may recognize alighting of the vehicle passenger from the vehicle by using at least one of the recognition result obtained using the sensor module, and/or information related to the connection of the electronic device 1000 with the mobile device. In an embodiment of the disclosure, the electronic device 1000 may periodically transmit a packet for identifying maintenance of the connection (e.g., a connection-identifying packet) with the mobile device connected through the network interface 1600 (see FIG. 2) at preset time intervals, and receive a connection acknowledgements from the mobile device, thereby recognizing that the passenger remains in the vehicle as, their mobile device remains connected to the electronic device 1000. That is, when the electronic device 1000 receives the connection acknowledgement from the mobile device, the electronic device 1000 may determine that the user of the mobile device is aboard the vehicle. When the electronic device 1000 fails to receive the connection acknowledgement from the mobile device 2000, and/or a predetermined time period elapses after transmission of the connection-identifying packet, the electronic device 1000 may determine that the user of the mobile device has exited the vehicle based on the disconnection of the mobile device from the electronic device 1000.

In an embodiment of the disclosure, the electronic device 1000 may recognize alighting of the passenger from the vehicle based on the identification result with respect to maintenance of connection with the mobile device, in combination with the recognition result with respect to the passenger using the infrared sensor.

In an embodiment of the disclosure, the electronic device 1000 may recognize seating on the seat based on the pressure measured using the seat sensor included in the seat of the vehicle and recognize alighting of the passenger from the vehicle based on a seating recognition result. For example, when the pressure measured by the seat sensor is less than or equal to the preset threshold value, the electronic device 1000 may determine that the passenger alights from the vehicle.

In an embodiment of the disclosure, the electronic device 1000 may capture imagery of the interior of the vehicle, including photographing the passenger, using the camera 1200 (see FIG. 2), detect the passenger from the passenger image by using image processing or an object recognition model, and recognize alighting of the passenger from the vehicle based on the detection result when the passenger is no longer present in the captured imagery. In some embodiments, this may be implemented in combination with the identification result regarding maintenance of connection with the mobile device. In an embodiment of the disclosure, the electronic device 1000 may recognize the passenger from the passenger image through training using a CNN including a pre-trained model parameter. The electronic device 1000 may recognize, for example, a face of the passenger. However, the disclosure is not limited thereto, and the electronic device 1000 may recognize the passenger from the passenger image by using an AI model including at least one of an RNN, an SVM, linear regression, logistic regression, Naive Bayes, random forest, a decision tree, or a k-nearest neighbor algorithm. The electronic device 1000 may determine that the passenger alights from the vehicle when the passenger is not recognized from the passenger image.

In operation S320, the electronic device 1000 may determine a deletion level of data related to personal information (e.g., or personal information-related data) of the passenger, based at least on the latest use time information, and use frequency of the electronic device 1000 by the passenger. The electronic device 1000 may determine a deletion level for selectively deleting data among the personal information-related data, instead of collectively deleting all personal information-related data of the passenger. For example, if the passenger uses the electronic device 1000 frequently, more of their personal information may be retained to improve user convenience. Conversely, if the passenger rarely or never uses the electronic device 1000, all of their information may be deleted, as they are unlikely to use it again in the future. The deletion level thus allows setting of different deletion granularities for different passengers, thereby improving each individual experience. In an embodiment of the disclosure, the electronic device 1000 may determine at least one piece of deletion-target data from among temporary files generated by the passenger through usage of the electronic device 1000, cache data, application configuration information, a newly installed application, user-generated data, or user's access information.

In an embodiment of the disclosure, the electronic device 1000 may determine the deletion level of the personal information-related data, based on identification information of the passenger, as well as the use history information including information about the latest use time information and use frequency of the passenger. For example, when the passenger logs in, the electronic device 1000 may compare identification information of a previous user (i.e., a user using the electronic device 1000 before the passenger), with identification information of the passenger, and delete personal information-related data of the previous user based on whether the identification of the previous user and the identification information of the passenger match. The identification information of the passenger may be obtained through login or may be obtained through biometric information of the passenger, obtained through a biometric recognition module (e.g., a fingerprint module or an iris recognition module).

In an embodiment of the disclosure, the electronic device 1000 may determine the deletion level of the personal information-related data based on owner information and vehicle operation type (e.g., public transportation or a sharing-service-provided vehicle) of the vehicle as well as use history information of the passenger. For example, a shared or public vehicle will result in a first deletion level due to the risk of privacy violations, whereas a privately owned vehicle may utilize a second deletion level lower than the first, resulting in deletion of less information, as less users have access to the vehicle.

In operation S330, the electronic device 1000 may delete the personal information-related data based on the determined deletion level. Data generated or edited by the passenger controlling an application on the electronic device 1000 may be stored in the data storage unit 1800 (see FIG. 2). In an embodiment of the disclosure, the electronic device 1000 may selectively delete deletion-target data according to the deletion level determined in operation S320 among data stored in the data storage unit 1800.

In operation S340, the electronic device 1000 may log out in response to a deletion completion signal with respect to the personal information-related data. The electronic device 1000 may automatically log out when completion of deletion of the personal information data is confirmed, and control a lock screen to be output on the display unit 1710 (see FIGS. 1 and 2).

Power supplied to the electronic device 1000 may be cut off after the elapse of a preset time after the logout.

Figure 4:
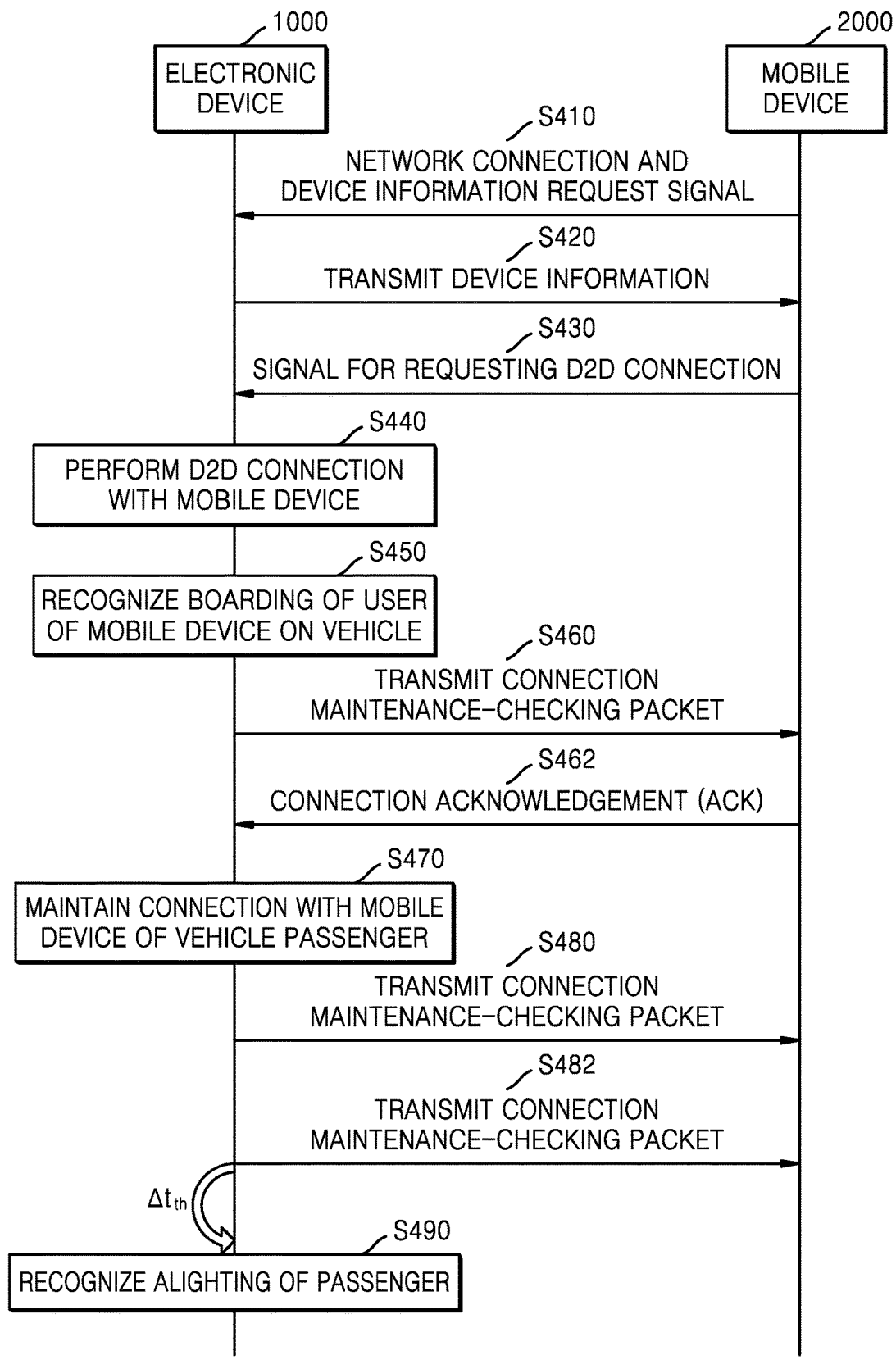
FIG. 4 is a flowchart showing a method, performed by an electronic device, of recognizing boarding/alighting of a passenger from the vehicle, based on information about maintenance of connection with a mobile device, according to an embodiment of the disclosure.

FIG. 4 is a flowchart showing a method, performed by the electronic device 1000, of recognizing boarding/alighting of a passenger, based on information about maintenance of connection with the mobile device 2000, according to an embodiment of the disclosure.

In operation S410, the electronic device 1000 may receive a network connection and device information request signal from the mobile device 2000. In an embodiment of the disclosure, the mobile device 2000 may transmit a signal for requesting Device-to-Device (D2D) connection with the electronic device 1000 and a signal for requesting information of the electronic device 1000 to the electronic device 1000.

In operation S420, the electronic device 1000 may transmit device information to the mobile device 2000. In an embodiment of the disclosure, the electronic device 1000 may control the network interface 1600 (see FIG. 2) to transmit information regarding at least one of device identification information (e.g., a device ID), or device specification information (e.g., CPU, RAM, etc.), an Internet protocol (IP) address, and a medium access control (MAC) address to the mobile device 2000.

In operation S430, the electronic device 1000 may receive the signal requesting a D2D connection from the mobile device 2000.

In operation S440, the electronic device 1000 may establish the D2D connection with the mobile device 2000. The electronic device 1000 may connect with the mobile device 2000 through at least one of communication schemes including WiFi Direct, Bluetooth, LTE-D2D, and 5G D2D.

In operation S450, the electronic device 1000 may recognize that the user of the mobile device 2000 has boarded the vehicle. When connection with the mobile device 2000 is performed, the electronic device 1000 may determine that the user (e.g., who possesses the mobile device 2000) has boarded the vehicle.

In operation S460, the electronic device 1000 may transmit a connection maintenance-identifying packet to the mobile device 2000. In an embodiment of the disclosure, the electronic device 1000 may transmit the connection maintenance-identifying packet to the mobile device 2000 through D2D communication. In an embodiment of the disclosure, the electronic device 1000 may periodically transmit the connection maintenance-identifying packet to the mobile device 2000 at preset time intervals.

In operation S462, the electronic device 1000 may receive a connection acknowledgement from the mobile device 2000.

In operation S470, when the electronic device 1000 receives the connection acknowledgement from the mobile device 2000, the electronic device 1000 may maintain connection with the mobile device 2000 of the vehicle passenger.

In operation S480, the electronic device 1000 may continue transmitting the connection maintenance-identifying packet to the mobile device 2000, and continue receiving connection acknowledgments (not depicted).

In operation S482, the electronic device 1000 may periodically transmit a connection maintenance-identifying packet to the mobile device 2000 at preset time intervals. However, after the operation of S482, the electronic device 1000 may fail to receive a connection acknowledgement from the mobile device 2000.

After the elapse of a threshold time $\Delta t_{th}$ in operation S490 from transmission of the connection maintenance-identifying packet without reception of a connection acknowledgement, the electronic device 1000 may detect alighting of the passenger from the vehicle, based on the presumption that the mobile device 2000 has broken connection with the electronic device. Accordingly, in operation S490, the electronic device 1000 may release the established connection with the mobile device 2000.

The electronic device 1000 according to the embodiment of the disclosure shown in FIG. 4 may periodically determine whether the D2D connection with the mobile device 2000 is maintained, and recognize that the user using the mobile device 2000 (e.g., the vehicle passenger) alights from the vehicle, when a connection maintenance acknowledgement is not received from the mobile device 2000 within the threshold time period. The electronic device 1000 according to the current embodiment of the disclosure may recognize alighting from the vehicle through the D2D connection, which in some embodiments thereby avoids a need to add separate hardware, increasing economic efficiency and reducing the unit price of a product.

FIG. 5 shows a table showing deletion-target data 520 of personal information-related data with respect to a deletion level 510 determined by the electronic device 1000, according to an embodiment of the disclosure. The table shown in FIG. 5 may be stored in the form of a lookup table (LUT) in the memory 1500 (see FIG. 2) of the electronic device 1000.

Referring to FIG. 5, the deletion level 510 of personal information-related data may include a total of four levels. The deletion level 510 may include, for example, Level 1 through Level 4. However, this is merely an example, and the number of deletion levels 510 may be greater than or equal to one.

When the deletion level 510 is determined to be Level 1, the electronic device 1000 may terminate any applications presently being executed and delete temporary files. In Level 1, the deletion-target data 520 may therefore indicate temporary files.

When the deletion level 520 is determined to be Level 2, the electronic device 1000 may delete deletion-target data preassociated or assigned to be "Level 1," and furthermore, delete cache data stored in the data storage unit 1800 (see FIG. 2). In Level 2, the deletion-target data 520 may therefore include temporary files and cache data.

When the deletion level 510 is determined to be Level 3, the electronic device 1000 may delete configuration information for one or more applications, any newly installed applications, and user-generated data, in addition to deleting data specified for deletion in Level 1 and Level 2. The 'user-generated data' may indicate data generated by the passenger (the user of the electronic device 1000) during execution of a corresponding application, such as a picture or a video captured using a camera application, messages exchanged while using a messenger application, etc. In Level 3, the deletion-target data 520 may include a temporary file, cache data, a configuration information of an application, a newly installed application, and user-generated data.

When the deletion level 510 is determined to be Level 4, the electronic device 1000 may delete user identification information in addition to deletion-target data as specified in Level 1, Level 2, and Level 3. The 'user identification information' may indicate user ID and password of the passenger boarding the vehicle and using the electronic device 1000. In an embodiment of the disclosure, the user identification information may include biometric information of the user, such as fingerprint information, iris information, facial contour information, etc. In Level 4, the deletion-target data 520 may include temporary files, cache data, configuration information of an application, newly installed applications, user-generated data, and user identification information.

The deletion level 510 may be determined based on the use history information including the latest use time and use frequency of the passenger (i.e., the user of the electronic device 1000). In an embodiment of the disclosure, when the user repeatedly logs on to the same electronic device 1000 some threshold number of repetitions, the electronic device 1000 may determine the deletion level 510 as Level 1 and delete the deletion-target data 520 according to Level 1 after the user alights from the vehicle. In an embodiment of the disclosure, when the user logs into and uses the electronic device 1000 and inputs user identification information, the electronic device 1000 may determine the deletion level 510 as Level 2 and delete the deletion-target data 520 according to Level 2 after the user alights the vehicle. When the user is changed (e.g.,, for example, when a second user logs into the electronic device 1000 after a first user logs into and uses the electronic device 1000 a plurality of times), the electronic device 1000 may determine the deletion level 510 of personal information to be Level 3 and delete the deletion-target data 520 according to Level 3. In an embodiment of the disclosure, when the user logs into the electronic device 1000 using a guest account, the electronic device 1000 may determine the deletion level 510 as Level 3 and delete the deletion-target data 520 according to Level 3 after the user alights from the vehicle.

In an embodiment of the disclosure, when a preset time elapses without login after deletion according to Level 1 and Level 2, the electronic device 1000 may determine the deletion level 510 as Level 3 and delete the deletion-target data 520 according to Level 3.

In an embodiment of the disclosure, the electronic device 1000 may determine the deletion level of the personal information-related data based on owner information and vehicle operation type (e.g., public transportation or sharing-service-provided vehicle) of the vehicle as well as use history information. For example, when the vehicle is a shared vehicle or an owner of the vehicle is transferred, the electronic device 1000 may determine the deletion level 510 as Level 4 and delete the deletion-target data 520 according to Level 4.

The table shown in FIG. 5 is an example of the deletion-target data 520 of the personal information-related data according to the deletion level 510, and an embodiment of the disclosure is not limited to the illustration of FIG. 5. The deletion-target data 520 may be determined differently from the illustration of FIG. 5. In an embodiment of the disclosure, the deletion-target data 520 according to the deletion level 510 may be edited, changed, modified, or deleted according to a user input.

Figure 6:
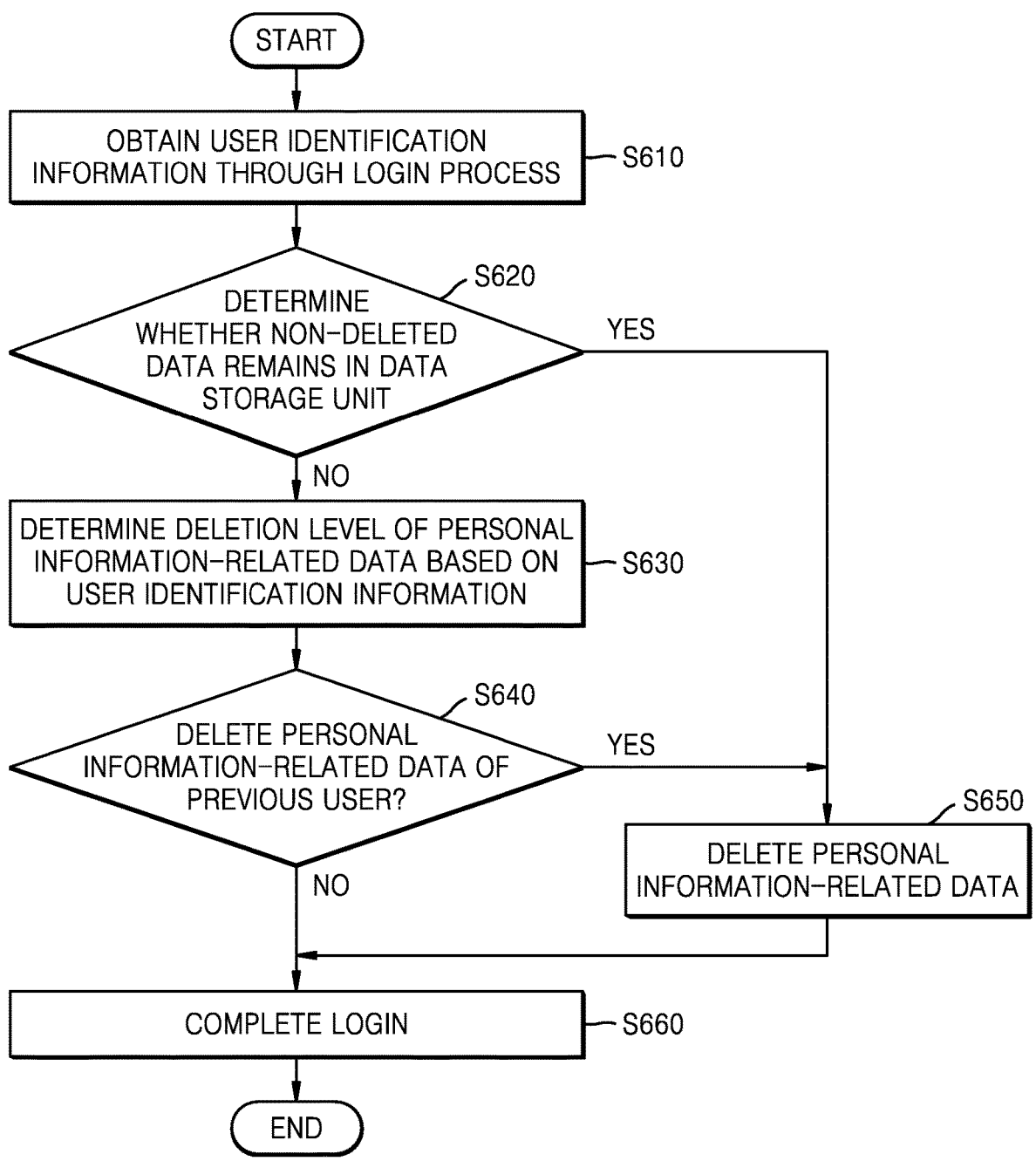
FIG. 6 is a flowchart showing an operating method of an electronic device in a login process of a vehicle passenger, according to an embodiment of the disclosure.

FIG. 6 is a flowchart showing an operating method of the electronic device 1000 in a login process of a vehicle passenger, according to an embodiment of the disclosure.

In operation S610, the electronic device 1000 may obtain user's identification information through the login process. Herein, the 'user' may be a passenger boarding the vehicle and using the electronic device 1000. The electronic device 1000 may receive the user's identification information, e.g., a user ID and password information, through the login. In an embodiment of the disclosure, the electronic device 1000 may recognize a user's fingerprint through the fingerprint recognition module 1310 (see FIG. 2) and obtain fingerprint information. In an embodiment of the disclosure, the electronic device 1000 may read a user's iris through the iris recognition module 1320 (see FIG. 2) and obtain iris information.

In operation S620, the electronic device 1000 may identify whether non-deleted data remains in the data storage unit 1800 (see FIG. 2). That is, during the deletion process, power supplied to the electronic device 1000 from the vehicle may be cut off or temporarily stopped (e.g., the vehicle may be shut off while deletion is still in progress). In an embodiment of the disclosure, the electronic device 1000 may determine whether non-deleted data remains stored among data related to personal information of a previous user in the data storage unit 1800, due to interruption or termination of the power supplied from the vehicle.

When the electronic device 1000 determines that non-deleted data does not remain in operation S630, the electronic device 1000 may proceed to S630 and determine a deletion level of the personal information-related data based on user's identification information. When the identification information obtained through the login process of operation S610 is identification information of the second user and a user using the electronic device 1000 before the second user is the first user, the electronic device 1000 may determine whether the identification information of the second user is the same as the identification information of the first user by comparison therebetween.

When the electronic device 1000 determines that non-deleted data remains in operation S620, the electronic device 1000 may delete personal information-related data stored in the data storage unit 1800 as seen in operation 650.

In operation S640, the electronic device 1000 may determine whether to delete the personal information-related data of the first user, i.e., the previous user, based on whether the identification information of the first user is the same as the identification information of the second user.

When the electronic device 1000 determines to delete the personal information-related data of the previous user (the first user) in operation S640, the electronic device 1000 may delete the personal information-related data of the first user stored in the data storage unit 1800 in operation S650.

In operation S660, the electronic device 1000 may complete the login process.

Figure 7:
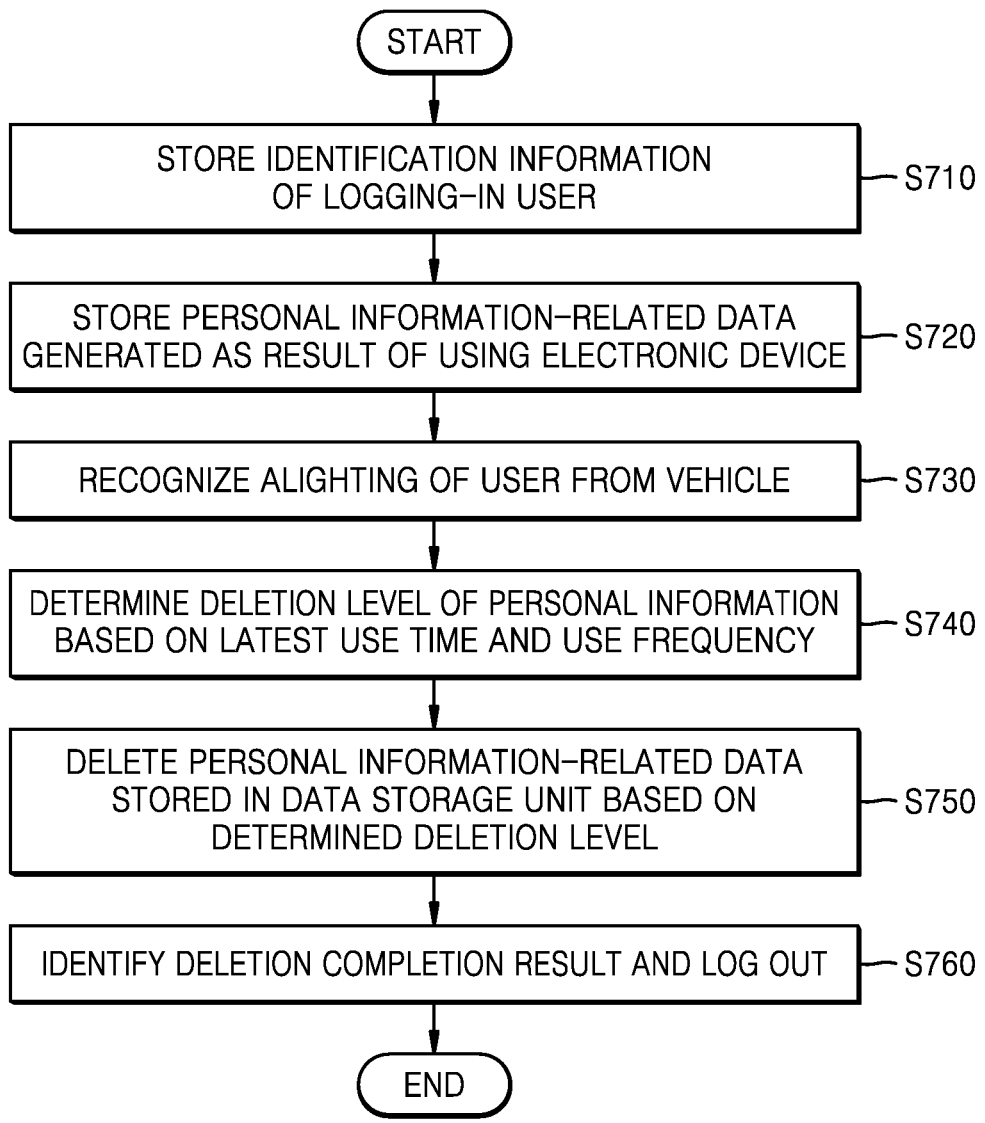
FIG. 7 is a flowchart showing an operating method of an electronic device in which the electronic device recognizes alighting of a vehicle passenger after a login process, deletes personal information-related data, and logs out, according to an embodiment of the disclosure.

FIG. 7 is a flowchart showing an operating method of the electronic device 1000 in which the electronic device recognizes alighting of a vehicle passenger after a login process, deletes personal information-related data, and logs out, according to an embodiment of the disclosure. Operation S710 of FIG. 7 may be performed after operation S660 shown in FIG. 6.

In operation S710, the electronic device 1000 may store identification information of the user logging into the electronic device 1000. Herein, the 'user' may be a passenger boarding the vehicle and completing the login process to use the electronic device 1000. In an embodiment of the disclosure, the electronic device 1000 may store the identification information of the user in the data storage unit 1800 (see FIG. 2).

In operation S720, the electronic device 1000 may store personal information data generated as a result of using the electronic device 1000. In an embodiment of the disclosure, the electronic device 1000 may accumulatively store at least one of a type of application(s) used by the user, user-visited websites, search history information in the application(s), newly installed application information, temporary files, or cache data in the data storage unit 1800. In an embodiment of the disclosure, the electronic device 1000 may execute data generated as a result of the user executing the application, and using the executed application. The 'user-generated data' may include, for example, a picture or a video taken using the camera application or messages exchanged with another user using the messenger application.

In operation S730, the electronic device 1000 may recognize alighting of the user from the vehicle. In an embodiment of the disclosure, the electronic device 1000 may recognize whether the passenger alights the vehicle, by using at least one of a recognition result obtained using the sensor module 1100 (see FIG. 2) or connection information with the mobile device. Operation S730 may be the same as operation S310 of FIG. 3, and thus further description will be omitted for the sake of brevity.

In operation S740, the electronic device 1000 may determine a deletion level of personal information-related data, based on the latest use time information and use frequency. Operation S740 may be the same as operation S320 of FIG. 3, and thus further description will be omitted for the sake of brevity.

In operation S750, the electronic device 1000 may delete the personal information-related data stored in the data storage unit 1800 (see FIG. 2), based on the determined deletion level. Operation S750 may be the same as operation S330 of FIG. 3, and thus further description will be omitted for the sake of brevity.

In operation S760, the electronic device 1000 may identify a deletion completion result and then log out. The electronic device 1000 may automatically log out when completion of deletion of the personal information data is determined and control a lock screen to be output on the display unit 1710 (see FIGS. 1 and 2).

Figure 8:
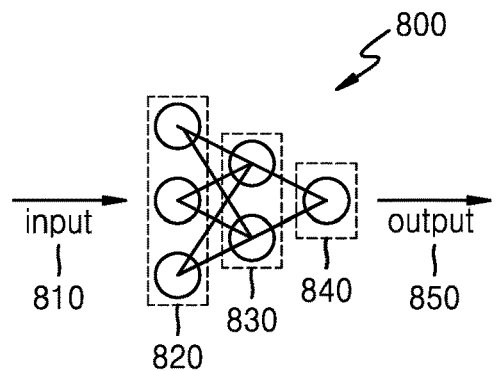
FIG. 8 is a diagram for describing an operation performed by an electronic device using an artificial intelligence technology, according to an embodiment of the disclosure.

FIG. 8 is a diagram for describing an operation performed using an AI technology, according to an embodiment of the disclosure.

More specifically, at least one of i) recognizing alighting of a passenger from a vehicle by using at least one of a recognition result obtained using a sensor module and information about connection with a mobile device, ii) determining a deletion level of data related to personal information of the passenger based on use history information of the passenger, which includes the latest use time and use frequency of the electronic device 1000, iii) deleting the personal information-related data based on the determined deletion level, or iv) performing logout in response to a deletion completion signal with respect to the personal information-related data, which are performed by the electronic device 1000, may be performed using an AI technology that performs computations through a neural network.

The AI technology may obtain a targeted result by performing processing such as analysis and/or classification, etc., with respect to input data based on operations through the neural network.

The AI technology may be implemented using an algorithm. Herein, an algorithm for implementing the AI technology or a set of algorithms may be referred to as the neural network. Herein, the neural network may receive input data and perform the above-described operations for analysis and/or classification, thus outputting result data. In order for the neural network to accurately output the result data corresponding to the input data, the neural network needs to be trained, i.e., training the neural network to self-discover or learn a method of analyzing a plurality of pieces of input data with respect to the neural network, a method of classifying the plurality of pieces of input data, and/or a method of extracting features utilized for generation of result data from the plurality of pieces of input data. More specifically, through training, the neural network may optimize weight values in the neural network by training data (e.g., a plurality of different images). The neural network may output a targeted result by processing the input data through the neural network having the optimized weight values.

When there are a plurality of hidden layers which are internal layers that perform operations, that is, when the depth of the neural network that performs operations increases, the neural network may be classified as a deep neural network. Examples of the AI neural network may include, but not limited to, a CNN, a deep neural network (DNN), an RNN, a restricted Boltzmann machine (RBM), a deep belief network (DBN), a bidirectional recurrent deep neural network (BRDNN), and a deep Q-network. The neural network may be segmented. For example, the CNN may be segmented into a deep convolution neural network (DCNN), a Capsnet neural network (not shown), etc.

The 'AI model' may mean a neural network including at least one layer operating to receive input data and output a targeted result. The 'AI model' may mean hardware for executing an algorithm that performs operations through the neural network and outputs a targeted result, a set of a plurality of algorithms, a processor for executing an algorithm (or a set of algorithms), software for executing an algorithm (or a set of algorithms), or hardware for executing an algorithm (or a set of algorithms).

At least one of i) recognizing alighting of a passenger from a vehicle by using at least one of a recognition result obtained using a sensor module and information about connection with a mobile device, ii) determining a deletion level of data related to personal information of the passenger based on use history information of the passenger, which includes the latest use time and use frequency of the electronic device 1000, iii) deleting the personal information-related data based on the determined deletion level, or iv) performing logout in response to a deletion completion signal with respect to the personal information-related data may be performed based on the AI model.

Referring to FIG. 8, a neural network 800 may be trained by receiving an input of training data. The trained neural network 800 may receive input data 810 through an input terminal 820, and the input terminal 820, a hidden layer 830, and an output terminal 840 may perform operations for outputting output data 850 by analyzing the input data 810 and data delivered from a previous layer. While there is one hidden layer 830 in FIG. 8, this is merely an example, and there may be a plurality of hidden layers 830.

In a disclosed embodiment of the disclosure, the neural network 800 may be trained to detect a passenger from a passenger image obtained from a camera and to determine alighting of the passenger from the vehicle based on a passenger detection result.

In a disclosed embodiment of the disclosure, the neural network 800 may be trained to recognize seating on the seat based on a pressure measured using the seat sensor 1120 (see FIG. 2) included in the seat of the vehicle and to recognize alighting of the passenger from the vehicle based on a seating recognition result.

In a disclosed embodiment of the disclosure, the neural network 800 may be trained to determine at least one piece of deletion-target data from among a temporary file generated as a result of the passenger using the electronic device 1000, cache data, application configuration information, a newly installed application, user-generated data, or user's access information.

In a disclosed embodiment of the disclosure, the neural network 800 may be trained to determine a deletion level of personal information-related data based on whether identification information of a logging-in passenger is the same as identification information of the previous user.

In a disclosed embodiment of the disclosure, the neural network 800 may be trained to determine the deletion level of the personal information-related data based on owner information of a vehicle having mounted thereon the electronic device 1000 and information about a vehicle operation type.

In a disclosed embodiment of the disclosure, the neural network 800 may be trained to identify non-deleted data due to cutoff or stop of power supplied from the vehicle to the electronic device 1000 among personal information-related data previously stored in the data storage unit 1800 (see FIG. 2) and to delete the determined non-deleted data.

In a disclosed embodiment of the disclosure, data or program code related to the neural network 800 that performs at least one of i) recognizing alighting of a passenger from a vehicle by using at least one of a recognition result obtained using a sensor module and information about connection with a mobile device, ii) determining a deletion level of data related to personal information of the passenger based on use history information of the passenger, which includes the latest use time and use frequency of the electronic device 1000, iii) deleting the personal information-related data based on the determined deletion level, or iv) performing logout in response to a deletion completion signal with respect to the personal information-related data, which are performed by the electronic device 1000 may be stored in the memory 1500 (see FIG. 2) and training using the neural network 800 may be performed by the processor 1400 (see FIG. 2).

Alternatively, the neural network 800 that performs at least one of i) recognizing alighting of a passenger from a vehicle by using at least one of a recognition result obtained using a sensor module and information about connection with a mobile device, ii) determining a deletion level of data related to personal information of the passenger based on use history information of the passenger, which includes the latest use time and use frequency of the electronic device 1000, iii) deleting the personal information-related data based on the determined deletion level, or iv) performing logout in response to a deletion completion signal with respect to the personal information-related data may be performed in a device (not shown) that is separate from the electronic device 1000 or the processor (not shown).

The foregoing operations using the neural network 800 may be performed by a server 3000 (see FIGS. 9 and 10) capable of communicating with the electronic device 1000 according to an embodiment of the disclosure through a wireless communication network. Communication between the electronic device 1000 and the server 3000 will be described with reference to FIGS. 9 and 10.

Figure 9:
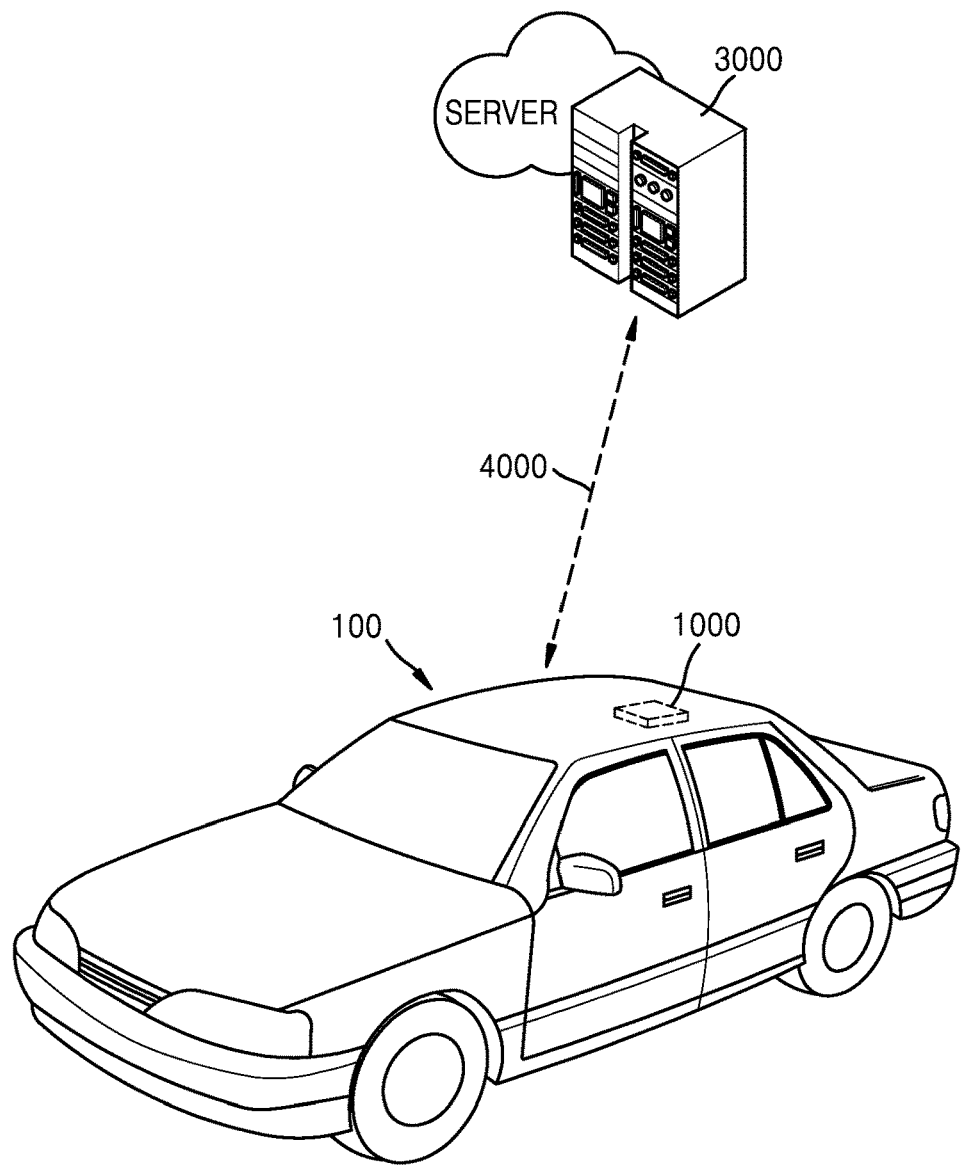
FIG. 9 is a diagram showing an embodiment of the disclosure where an electronic device according to the disclosure operates with a server.

FIG. 9 is a diagram showing an embodiment of the disclosure where the electronic device 1000 according to the disclosure interoperates with a server 3000.

The server 3000 may transmit and receive data to and from the electronic device 1000 through the communication network to process the data.

Figure 10:
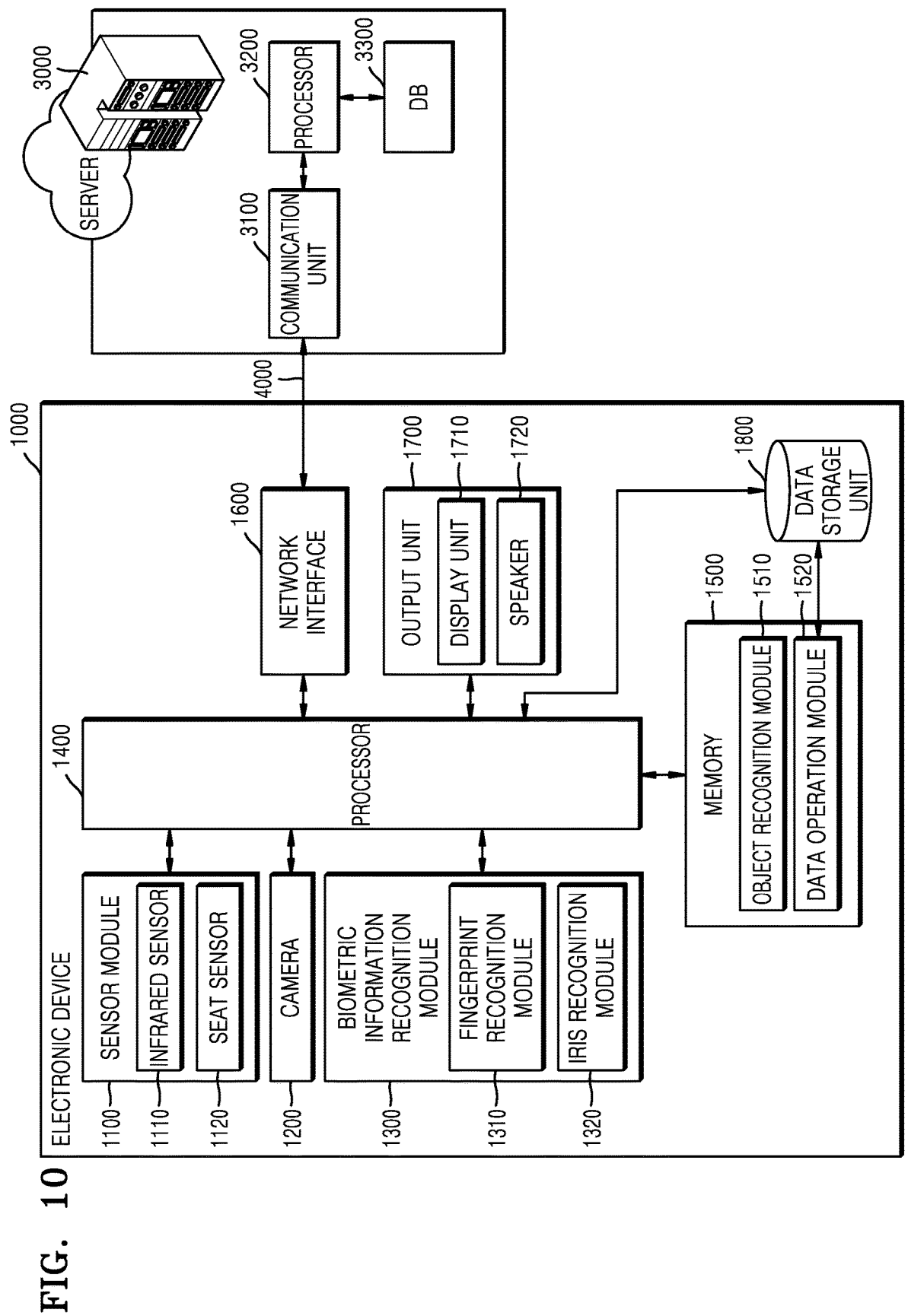
FIG. 10 is a diagram for describing in detail FIG. 9.

Referring to FIG. 10, the server 3000 may include a communication unit 3100 communicating with the electronic device 1000, a processor 3200 executing at least one instruction, and a database 3300.

The server 3000 may train an AI model and store the trained AI model. The server 3000 may perform, using the trained AI model, at least one of i) recognizing alighting of a passenger from a vehicle by using at least one of a recognition result obtained using a sensor module and information about connection with a mobile device, ii) determining a deletion level of data related to personal information of the passenger based on use history information of the passenger, which includes the latest use time and use frequency of the electronic device 1000, iii) deleting the personal information-related data based on the determined deletion level, or iv) performing logout in response to a deletion completion signal with respect to the personal information-related data.

Generally, the electronic device 1000 may have limited memory storage capacity, operation processing speed, training data set collection ability, etc., when compared to the server 3000. Thus, operations using storage of large-volume data and large-scale computations may be performed in the server 3000, and then data and/or AI model may be transmitted to the electronic device 1000 through the communication network. The electronic device 1000 may receive and use the data and/or AI data through the server 3000 without a processor having a large-capacity memory and a fast-operating ability, thereby performing an operation rapidly and easily.

In a disclosed embodiment of the disclosure, the server 3000 may include the neural network 800 described with reference to FIG. 8.

FIG. 10 is a diagram for describing in detail FIG. 9.

Referring to FIG. 10, the server 3000 may include the communication unit 3100, the processor 3200, and the database 3300.

The communication unit 3100 may perform communication with an external device (e.g., a server) through a wireless communication network 4000. Herein, the external device (not shown) may include a server (e.g., 3000) that performs at least one of operations needed by the electronic device 1000 or transmits data needed by the electronic device 1000.

The communication unit 3100 may include at least one communication module such as a short-range communication module, a wireless communication module, a mobile communication module, a broadcasting reception module, etc. Herein, at least one communication module may mean a tuner that performs broadcasting reception or a communication module capable of performing data transmission/reception through a network complying with communication standards such as Bluetooth, wireless local area network (WLAN), Wireless Fidelity (WiFi), Wireless Broadband (WiBro), World Interoperability for Microwave Access (WiMax), code divisional multiple access (CDMA), wideband CDMA (WCDMA), the Internet, $3^{rd}$-generation (3G), $4^{th}$-generation (4G), 5G, and/or a communication scheme using millimeter waves (mmWave).

For example, the communication unit 3100 may quickly transmit and receive large-volume data by performing communication using millimeter waves (mmWave). More specifically, the vehicle may quickly receive the large-volume data by using the millimeter waves and quickly provide data utilized for safety of the vehicle 100 (e.g., data utilized for autonomous driving, data utilized for a navigation service, etc.), user use content (e.g., movies, music, etc.), or the like, thereby increasing safety of the vehicle and/or user convenience.

The mobile communication module included in the communication unit 3100 may perform communication with another device (e.g., the server 3000) located at a remote distance through the communication network complying with the communication standards such as 3G, 4G, and/or 5G, etc. Herein, the communication module communicating with another device located at a remote distance may be referred to as a 'remote-distance communication module'.

The processor 3200 may control an overall operation of the server 3000. For example, the processor 3200 may execute operations by executing at least one of at least one instruction or programs of the server 3000.

The database 3300 may include a memory (not shown) in which at least one of at least one instruction, program, or data needed for the server 3000 to perform a particular operation may be stored. The database 3300 may store data needed for the server 3000 to perform an operation by a neural network.

In a disclosed embodiment of the disclosure, the server 3000 may store the neural network 800 described with reference to FIG. 8. The neural network 800 may be stored in at least one of the processor 3200 or the database 3300. The neural network 800 included in the server 3000 may be a neural network for which training has been completed.

The server 3000 may transmit the training-completed neural network to the network interface 1600 of the electronic device 1000 through the communication unit 3100. The electronic device 1000 may obtain and store the training-completed neural network and obtain targeted output data through the neural network.

A program executed by the electronic device 1000 described in the specification may be implemented by a hardware component, a software component, and/or a combination of the hardware component and the software component. A program may be executed by any system capable of executing computer-readable instructions.

Software may include a computer program, a code, an instruction, or a combination of one or more thereof, and may configure a processing device to operate as desired or independently or collectively instruct the processing device.

Software may be implemented as a computer program including an instruction stored in a computer-readable storage media. Examples of the computer-readable recording medium may include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A program according to embodiments of the disclosure disclosed in the specification may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the device or an electronic market (e.g., Google Play Store or App Store). For the electronic distribution, at least a part of the software program may be stored in a storage medium or temporarily generated. In this case, the storage medium may be a storage medium of a server in the manufacturer of the vehicle or the electronic device 1000, the server of the electronic market, or a relay server that temporarily stores a software program.

The computer program product may include a storage medium of the server 3000 or a storage medium of the electronic device 1000 in a system including the electronic device 1000, the server 3000 (see FIGS. 9 and 10), and other electronic devices. Alternatively, when there is a third device (e.g., a smart phone) communicating with the electronic device 1000, the computer program product may include a storage medium of the third device. Alternatively, the computer program product may include a software program transmitted from the electronic device 1000 to the electronic device or the third device or from the third device to the electronic device.

In this case, one of the electronic device 1000, another electronic device, and the third device may execute the method according to embodiments of the disclosure by executing the computer program product. Alternatively, two or more of the electronic device 1000, the mobile device 2000, and the third device may execute the computer program product to execute the method according to the embodiments of the disclosure in a distributed manner.

For example, the electronic device 1000 may execute the computer program product stored in the memory 1500 (see FIG. 2) to control another electronic device communicating with the electronic device 1000 to perform the method according to the embodiments of the disclosure.

In another example, the third device may execute the computer program product to control the electronic device communicating with the third device to perform the method according the embodiment of the disclosure.

When the third device executes the computer program product, the third device may download the computer program product from the electronic device 1000 and execute the downloaded computer program product. Alternatively, the third device may execute a computer program product provided in a preloaded state to execute the method according to the disclosed embodiments of the disclosure.

While the embodiments of the disclosure have been described in connection with specific examples and drawings, it would be understood by a person skilled in the art that various modifications and changes may be possible from the foregoing disclosure. For example, even when described techniques are performed in a sequence different from the described method and/or components such as computer systems, modules, etc., are combined or connected differently from the described method, or replaced with other components or equivalents, an appropriate result may be achieved.

What is claimed is:

1. An electronic device mounted on a vehicle, the electronic device comprising:
   a sensor module configured to recognize boarding and alighting of a passenger from the vehicle;
   a network interface configured to communicate with a mobile device disposed in the vehicle;
   a memory, storing a program including one or more instructions; and
   a processor, configured to execute the one or more instructions of the program, causing the electronic device to:
   detect alighting of the passenger using the sensor module, or detect alighting of the passenger when the mobile device disconnects from the network interface;
   determine a deletion level for data related to personal information of the passenger, the deletion level based on a use history information of the passenger, including a latest use time and a use frequency of the electronic device by the passenger while the passenger was disposed within the vehicle and prior to the detected alighting; and
   delete the data from the memory according to the determined deletion level.

2. The electronic device of claim 1, wherein detecting alighting of the passenger from the vehicle using the network interface further includes:
   detecting the passenger is present in the vehicle by periodically transmitting a packet to the mobile device and receiving a response from the mobile device confirming the mobile device is present in the vehicle; and
   detecting the passenger alights from the vehicle after transmitting the packet and receiving no response from the mobile device.

3. The electronic device of claim 1, wherein the sensor module includes an infrared sensor, and
   wherein alighting of the passenger is detected when the mobile device is disconnected from the network interface, and the passenger is detected as absent from an interior of the vehicle based on the infrared sensor.

4. The electronic device of claim 1, wherein the sensor module further includes a camera configured to continually capture images of an interior of the vehicle, and the one or more instructions are executable by the processor to:
   execute object recognition to detect the passenger within the continually captured images, indicating the passenger is disposed within the interior of the vehicle,
   wherein alighting of the passenger is detected when the mobile device is disconnected from the network interface and when the passenger is detected as absent from the continually captured images.

5. The electronic device of claim 1, wherein the sensor module includes a pressure sensor disposed in a seat of the vehicle,
   wherein the passenger is detected as disposed in the vehicle based on detecting, by the pressure sensor, a predetermined threshold level of pressure applied to the seat of the vehicle, and
   wherein the passenger is detected as alighted from the vehicle based on detecting, by the pressure sensor, less than the predetermined threshold level of pressure applied to the seat of the vehicle.

6. The electronic device of claim 1, wherein the data related to the personal information includes at least one of a temporary file generated via usage of the electronic device by the passenger, cache data, application configuration information, a newly installed application, passenger-generated data, or access information of the passenger.

7. The electronic device of claim 1, wherein the deletion level is determined based on the use history information, and whether the personal information of the passenger matches personal information generated by a previous user.

8. The electronic device of claim 1, wherein the deletion level is determined based on the use history information, identification information of an owner of the vehicle, and information indicating a type of vehicle operation.

9. The electronic device of claim 1, wherein the processor is further configured to execute the one or more instructions to:
   after detecting logout of a first passenger, receive user identification information of a second passenger through a login function;
   determine whether to delete first data related to first personal information of the first passenger, based on the received user identification information of the second passenger; and
   delete the first data related to the first personal information of the first passenger based on a result of the determination.

10. The electronic device of claim 1, wherein the one or more instructions are executable by the processor to:
    identify a portion of the data that failed deletion due to an interruption in power supply to the electronic device from the vehicle; and
    delete the identified portion of data.

11. An operating method of an electronic device mounted on a vehicle, the operating method comprising:
    detecting alighting of a passenger using a sensor module, or when a mobile device disconnects from a network interface;
    determining, by a processor, a deletion level for data related to personal information of a passenger, the deletion level based on a use history information of the passenger, including a latest use time and a use frequency of the electronic device by the passenger while the passenger was disposed within the vehicle and prior to the detected alighting;
    deleting the data from a memory according to the determined deletion level; and
    in response to receive a signal indicating completion of the deletion, logging the passenger out.

12. The operating method of claim 11, wherein detecting alighting of the passenger from the vehicle using the network interface further includes:
    detecting the passenger is present in the vehicle by periodically transmitting a packet to the mobile device and receiving a response from the mobile device confirming the mobile device is present in the vehicle; and
    detecting the passenger alights from the vehicle after transmitting the packet and receiving no response from the mobile device.

13. The operating method of claim 11, wherein the sensor module further includes a camera configured to continually capture images of an interior of the vehicle, the method further comprising:
- executing object recognition to detect the passenger within the continually captured images, indicating the passenger is disposed within the interior of the vehicle,
- wherein alighting of the passenger is detected when the mobile device is disconnected from the network interface and when the passenger is detected as absent from the continually captured images.

14. The operating method of claim 11, wherein the sensor module includes a pressure sensor disposed in a seat of the vehicle,
- wherein the passenger is detected as disposed in the vehicle based on detecting, by the pressure sensor, a predetermined threshold level of pressure applied to the seat of the vehicle, and
- wherein the passenger is detected as alighted from the vehicle based on detecting, by the pressure sensor, less than the predetermined threshold level of pressure applied to the seat of the vehicle.

15. The operating method of claim 11, wherein the data related to the personal information includes at least one of a temporary file generated via usage of the electronic device by the passenger, cache data, application configuration information, a newly installed application, passenger-generated data, or access information of the passenger.

16. The operating method of claim 11, wherein the deletion level is determined based on the use history information, and whether the personal information of the passenger matches personal information generated by a previous user.

17. The operating method of claim 11, wherein the deletion level is determined based on the use history information, identification information of an owner of the vehicle, and information indicating a type of vehicle operation.

18. The operating method of claim 11, further comprising:
- after detecting logout of a first passenger, receiving user identification information of a second passenger through a login function;
- determining, by the processor, whether to delete first data related to first personal information of the first passenger, based on the received user identification information of the second passenger; and
- deleting the first data related to the first personal information of the first passenger based on a result of the determination.

19. The operating method of claim 11, further comprising:
- identifying a portion of the data that failed deletion due to an interruption in power supply to the electronic device from the vehicle; and
- deleting the identified portion of data.

20. A computer program product comprising a non-transitory computer-readable storage medium, wherein the computer-readable storage medium comprises instructions executed by an electronic device mounted on a vehicle, the instructions comprising:
- detecting alighting of a passenger using a sensor module, or when a mobile device disconnects from a network interface;
- determining, by a processor, a deletion level for data related to personal information of a passenger, the deletion level based on a use history information of the passenger, including a latest use time and a use frequency of the electronic device by the passenger while the passenger was disposed within the vehicle and prior to the detected alighting;
- deleting the data from a memory according to the determined deletion level; and
- in response to receive a signal indicating completion of the deletion, logging the passenger out.

* * * * *